May 16, 1944.    A. L. JOHNSON    2,348,980
TRANSMISSION
Filed March 24, 1941    8 Sheets-Sheet 1
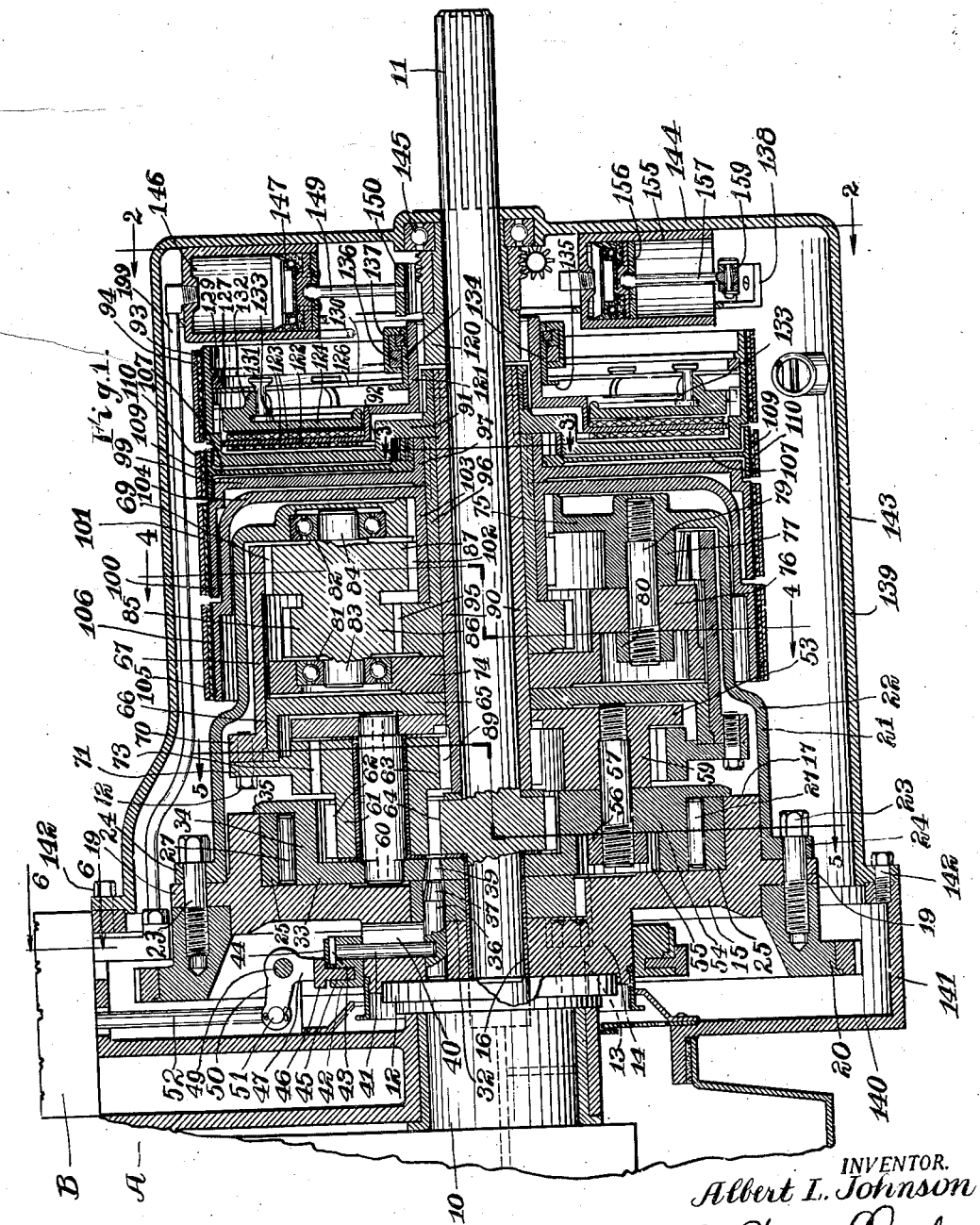
INVENTOR.
Albert L. Johnson
BY
ATTORNEYS.

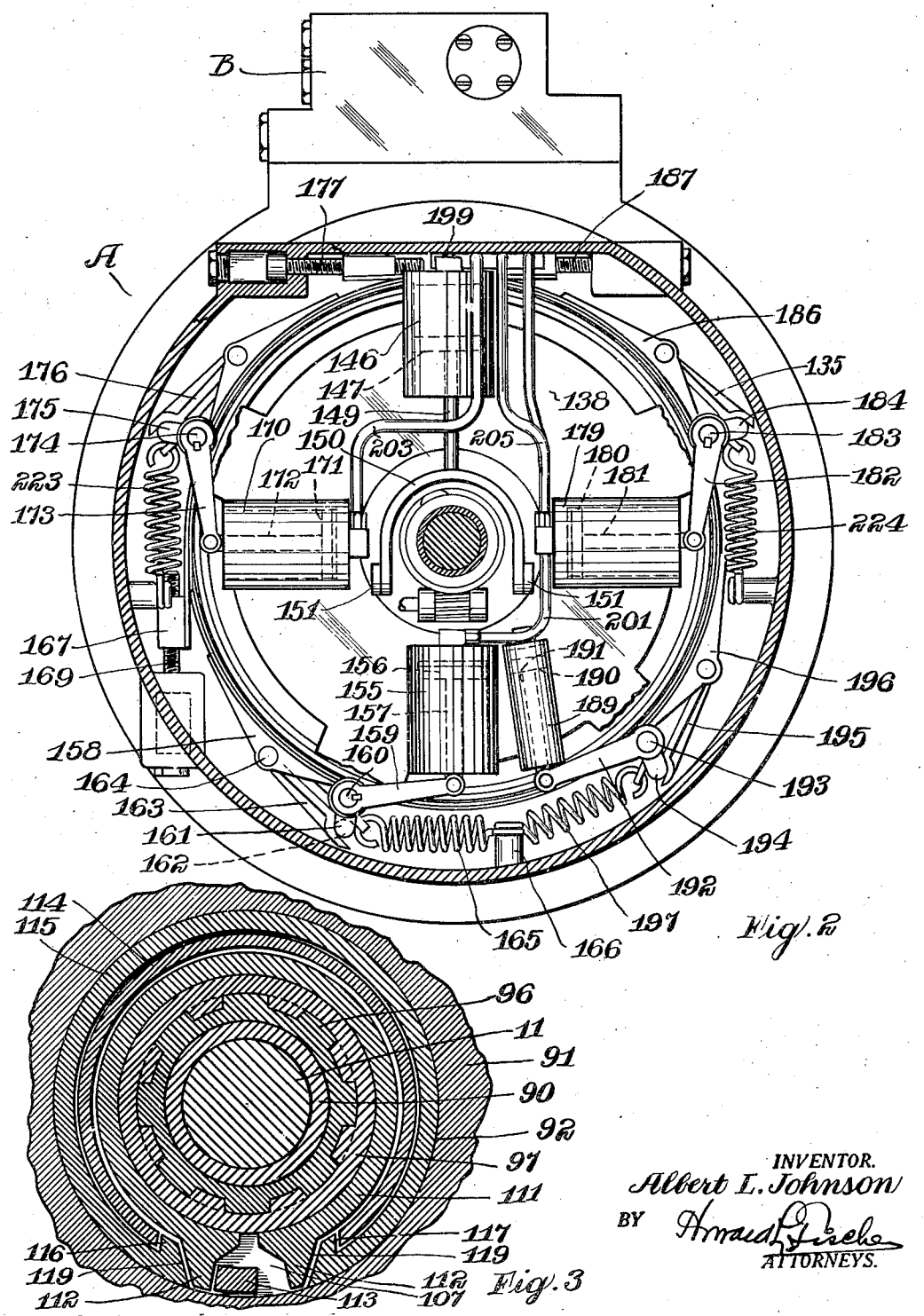

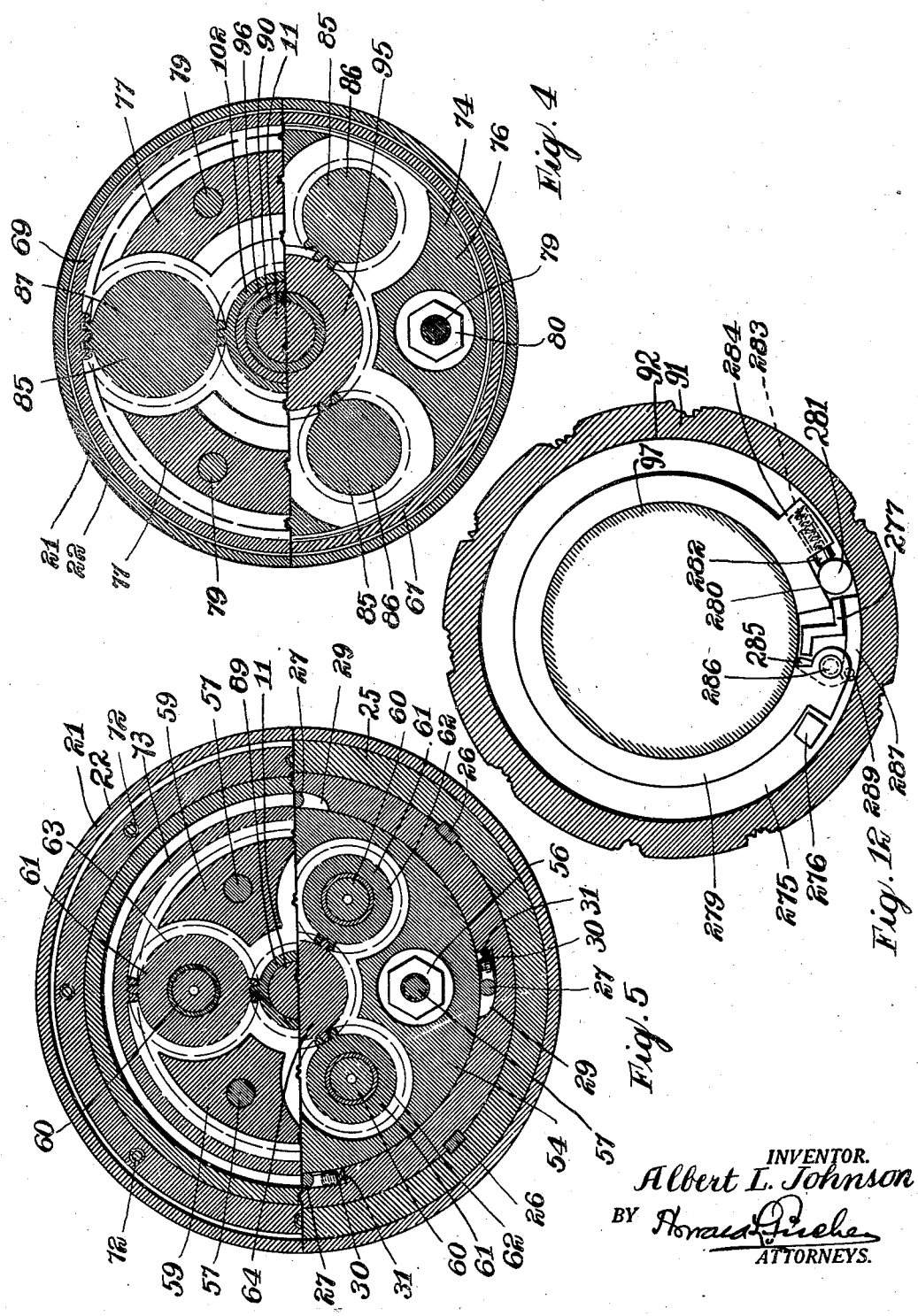

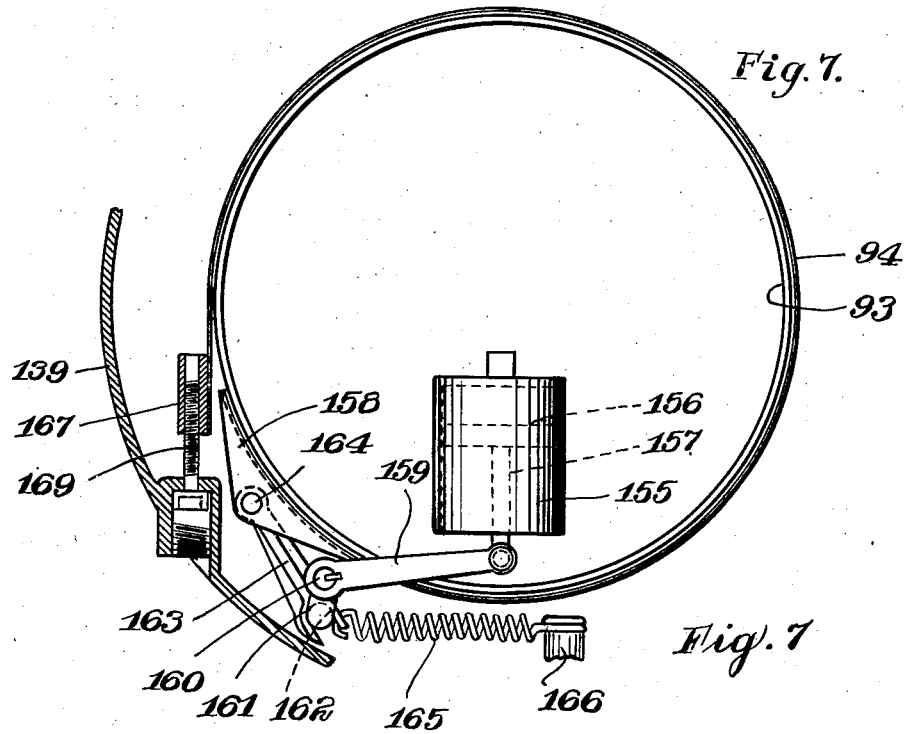
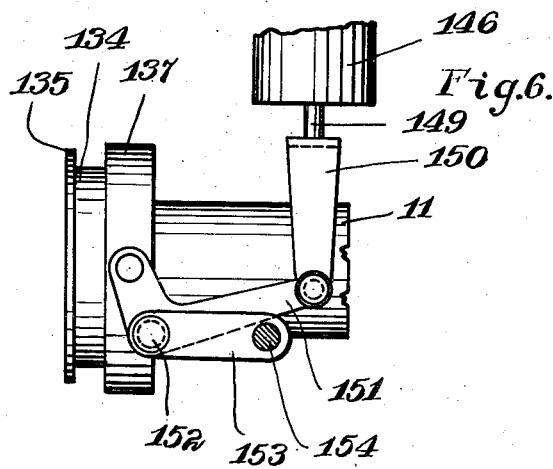

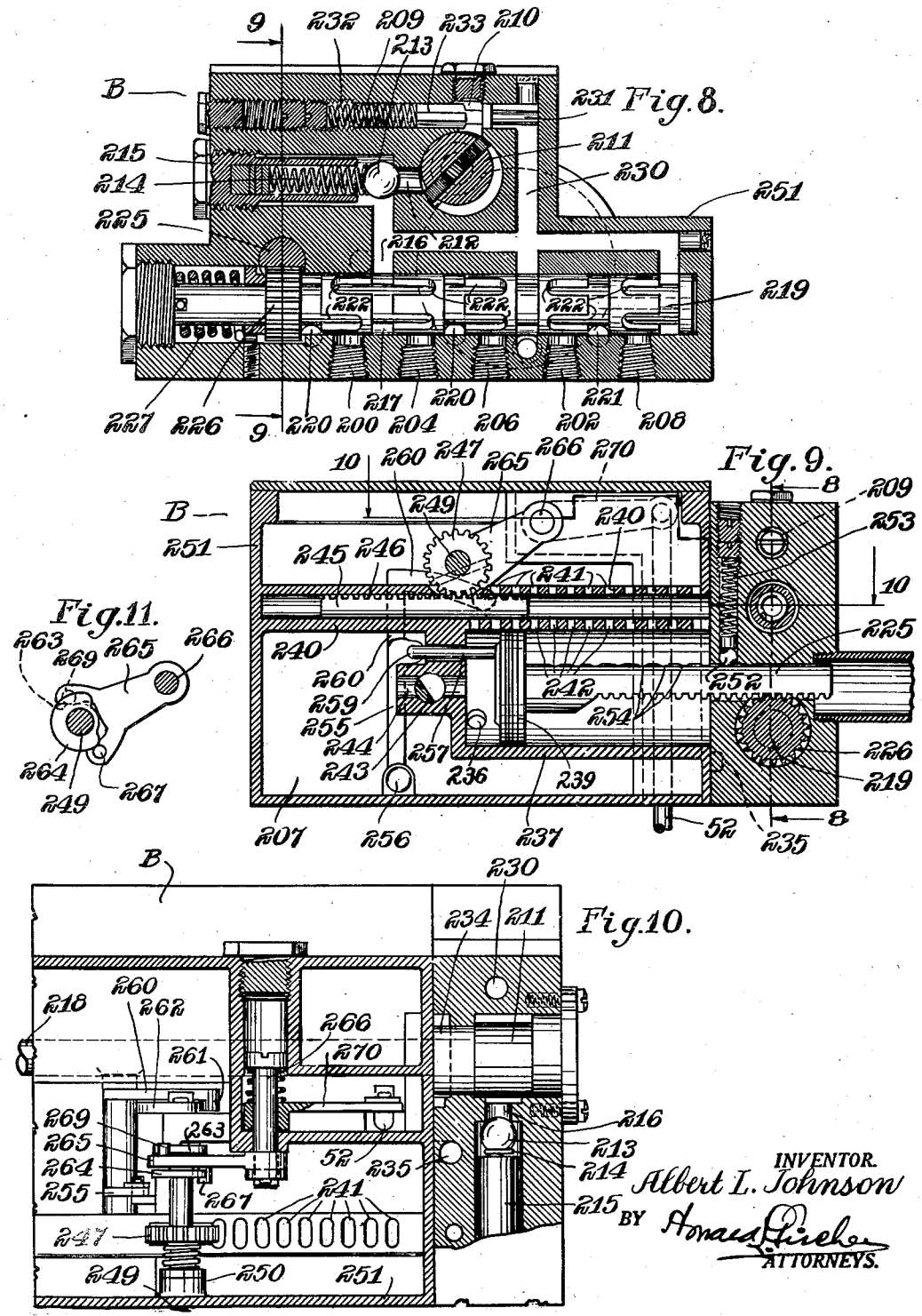

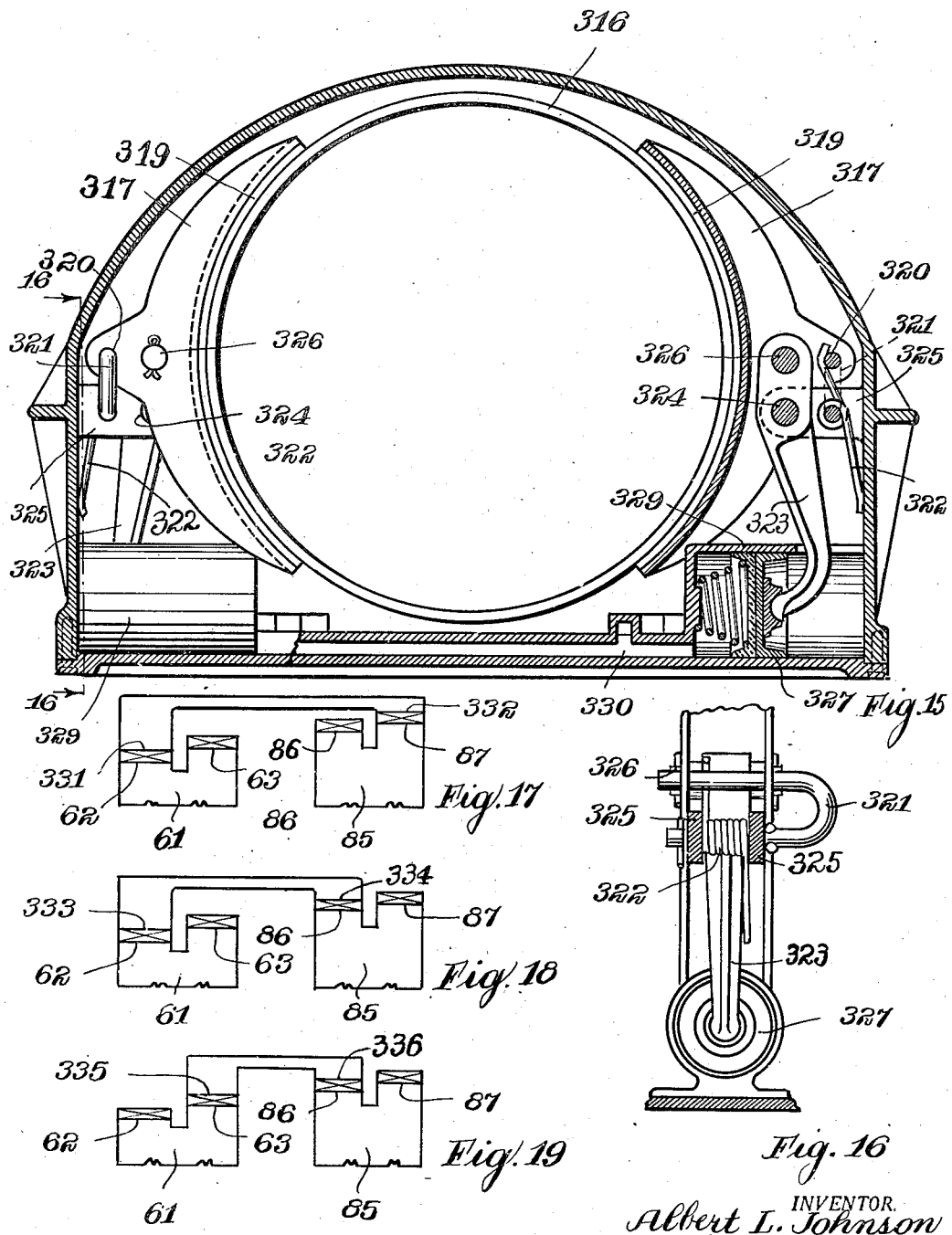

May 16, 1944.  A. L. JOHNSON  2,348,980
TRANSMISSION
Filed March 24, 1941   8 Sheets-Sheet 8

INVENTOR.
Albert L. Johnson
BY
ATTORNEYS.

Patented May 16, 1944

2,348,980

UNITED STATES PATENT OFFICE 2,348,980

TRANSMISSION

Albert L. Johnson, White Bear Lake, Minn., assignor to Johnson Power-On Transmission Corporation, St. Paul, Minn., a corporation of Minnesota Application March 24, 1941, Serial No. 384,792

32 Claims. (Cl. 74—276)

My invention relates to an improvement in transmissions wherein it is desired to provide a power transmitting device in which the gears are constantly in mesh.

Transmissions of various types have been previously constructed in which the gears are arranged in epicyclic trains, so that all of the gears remain constantly in mesh. Various difficulties have arisen with these former constructions. In the first place, the bulk of the gears rotating with the drive or driven shaft has limited the number of speed changes of the driven shaft with relation to the drive shaft. In other words, the number of gear ratios which could be attained without too greatly increasing the weight of the rotating parts was thought to be greatly limited.

In the previously filed application for patent for automatic transmission, Serial No. 315,216, filed January 23, 1940, a transmission was illustrated in which a pair of ring gears were connected together, each of which meshed with a planetary gear. The gear carriers for these planetary gears travelled at a speed equal to, or greater than, the speed of the drive shaft. One set of planetary gears comprised double gear means including a pair of different diameter gears integrally connected together. Each of the gears of the double gear was provided with a sun gear, one of which was on the driven shaft, and the other of which was ordinarily rotatable with respect thereto. The planetary gear means connected to the other ring gear was also provided with a sun gear. By holding various combinations of the sun gears stationary, and by locking certain parts of the mechanism together, various speed ratios could be obtained.

I have found that, while the original construction illustrated in the application above referred to was practical, useful, and advantageous, it was possible to approximately double the speed ratios obtainable without appreciably increasing the working parts necessary. Accordingly, the present invention relates to an improved construction wherein a great number of speed ratios can be obtained.

It is an object of the present invention to provide a transmission which is so constructed that it may be used to take the place of the flywheel, clutch, and transmission and overdrive ordinarily used with an internal combustion engine. This transmission may be completely automatic, or may be hand controlled, according to the desire of the manufacturer or operator. During all of the operation of the transmission, from reverse to the highest forward speed ratio, all of the gears are constantly in mesh.

It is a feature of my invention that my transmission may be controlled by operation of a pivoted lever which may merely pivot from one extreme position to the other. In one extreme position of the lever, the transmission is in reverse. Movement of the lever shifts the transmission through neutral position to forward speed positions, the speed ratio gradually increasing as the lever pivots to its other extreme position. Such a control is of extreme advantage, particularly for tanks and tractors. If two transmissions are provided, one of which controls the movement of each drive wheel or tank tread, the operator may have two controlling levers, one for each individual transmission. The flexibility of movement of the tank is greatly increased with such an arrangement, as each transmission continuously connects the engine to its wheel or tread providing no break in power during the shifting process and as any desired relation between the speeds of the wheels or treads may be instantly obtained without the use of brakes or other such means to mechanically hold one wheel or tread stationary, or to slacken the speed of the same.

It is further a feature of my invention that my transmission is so controlled that it may operate as an automatic transmission, or may be maintained in a predetermined speed ratio. If, for example, it is desired to prevent the vehicle bearing the transmission from going into overdrive while going down a hill or grade, this may be accomplished. Thus my transmission has all of the advantages of the usual automatic transmission without the usual difficulties attendant thereto.

These and other objects and novel features of my invention, will be more clearly and fully set forth in the following specification and claims.

In the drawings forming a part of my specification:

Figure 1 is a longitudinal sectional view through the transmission, showing the relationship of the parts.

Figure 2 is an end view of the brake band operating mechanism, the view being taken sectional through the transmission housing on the line 2—2 of Figure 1.

Figure 3 is a cross-sectional view through the mechanism for connecting certain of the sun gears to travel in unison in the transmission on the line 3—3 of Figure 1.

Figure 4 is a cross-sectional view through the transmission, the position of the section being indicated by the line 4—4 of Figure 1.

Figure 5 is a cross-sectional view through the transmission, the position of the section being indicated by the line 5—5 of Figure 1.

Figure 6 is a side elevation detail view of a clutch operating mechanism used in my transmission.

Figure 7 is a diagrammatic view of the manner in which the brake bands are actuated.

Figure 8 is a cross-sectional view through the control mechanism for the transmission, the position of the section being indicated by the line 8—8 of Figure 9.

Figure 9 is a sectional view through the control mechanism, the position of the section being indicated by the line 9—9 of Figure 8.

Figure 10 is another sectional view through the control mechanism, the position of the section being indicated by the line 10—10 of Figure 9.

Figure 11 is a detail view of a portion of the control mechanism.

Figure 12 is a cross-sectional view similar to Figure 3, showing a modified form of sun gear locking means to cause rotation of the sun gears in unison.

Figure 15 is a sectional view through the transmission, with the gears and shafts thereof omitted, illustrating an alternative method of holding stationary the brake drums connected to the various sun gears.

Figure 16 is an end view of the brake operating mechanism, the position of the section being indicated by the line 16—16 of Figure 15.

Figure 17 is a diagrammatic view of an alternative arrangement of double ring gear and planetary gears.

Figure 18 is another diagrammatic view of an alternate arrangement of double ring gear and planetary gears.

Figure 19 is still another diagrammatic view of a modified form of ring gear arrangement.

Figures 13, 14:
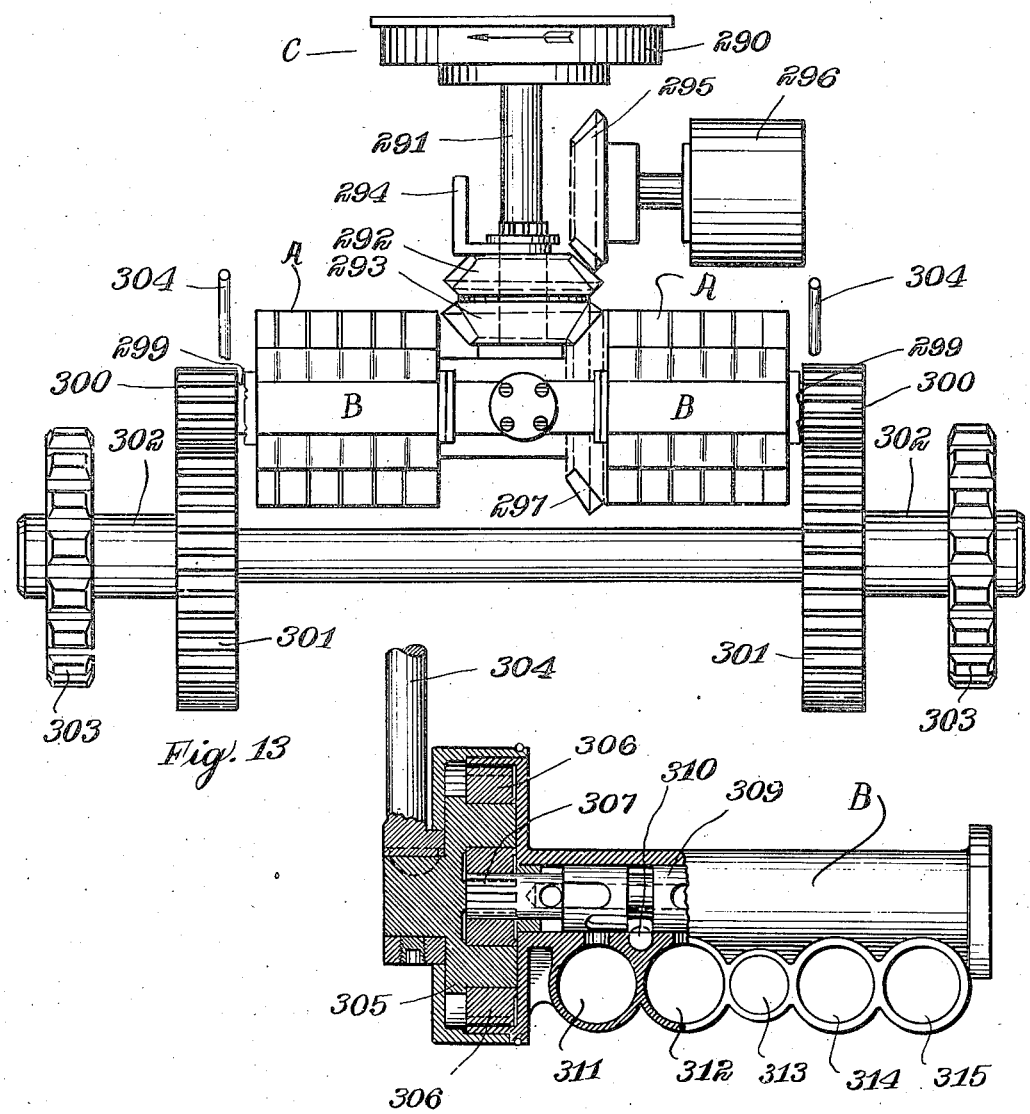
Figure 13 is a diagrammatic view of the operating mechanism of a tank or tractor, showing the manner in which the transmission may be positioned with relation thereto.
Figure 14 is an elevation view, partly in section, of a control valve for a tank or tractor of the type illustrated in Figure 8 of the drawings.

In order that the invention be clearly understood, the transmission itself, and the construction thereof, will first be explained. The control means for the transmission will be more readily understood once the structure of the transmission has been described.

The transmission is designated generally by the letter A, and includes a drive shaft 10, which in the present case is an engine crank shaft, and an axially aligned driven shaft 11. The drive shaft 10 is provided with an end flange 12, to which is bolted by bolts 13, the hub 14 of an end plate 15. The hub 14 encircles the driven shaft 11, and is placed therefrom by means of the bearing 16.

The end plate 15 is equipped with a cylindrical flange 17 near the periphery thereof. A ring-shaped flange 19 extends outwardly from the cylindrical flange 17 intermediate the ends of the flange 17. A gear ring 20 encircles the flange 17 on one side of the flange 19, and the substantially cylindrical wall 21 of a housing 22 encircles the flange 17 on the other side of the flange 19. Bolts 23 extend through the flanged edge 24 of the housing 22, through the flange 19, and into the gear ring 20, holding the housing 22 and the gear ring 20 in proper relation to the supporting end plate 15. The gear ring 20 is ordinarily engaged by a pinion on a starting motor, not shown.

As will be best seen in Figures 1 and 5 of the drawings, the outer race 25 of a one way clutch is secured within the flange 17. Keys 26 (see Figure 5) hold this outer race 25 from rotation relative to the flange 17 and end plate 15. Balls or rollers 27 are positioned in wedge-shaped slots 29 in the outer race 25. Spring elements 30 may be positioned between the rollers 27 and one end 31 of the slots 29, to insure the engagement of the rollers 27 with the inner race of the one way clutch when the outer race is travelling as fast as the inner race. As the outer race 25 is secured for rotation with the drive shaft, it will be seen that the inner race will travel as fast or faster than the outer race at all times, as it is prevented from travelling at a slower rate of speed by the one way clutch.

The hub 14 is provided with an axial bore of somewhat greater diameter than the outer diameter of the bearing 16 which it encircles; and a ring 32 substantially fills this axial bore. The ring 32 could be made a part of the hub 14, but for ease of assembly is formed as a separate ring which overlies the bearing 16 and rotates with the hub 14.

A planet gear carrier 33 encircles the bearing 16 adjacent the ring 32. This planet gear carrier 33 is in the form of a disc having a substantially cylindrical ring 34 at its outer extremity. The ring 34 forms the inner race of the one way clutch previously described; and the rollers 27 engage the outer surface of this ring 34 when there is a tendency for the gear carrier 33 to travel at a slower rate of speed than the outer race 25 thereof. A circumferentially extending flange 35 extends outwardly from one edge of the ring 34 into overlapping relation with the flange 17 to hold the rollers 27 in their proper place.

Under certain circumstances which will be later described in detail, it is desirable to have the gear carrier move in unison with the drive shaft 10. In order that this result may be attained, I provide a series of slidable pins in suitable recesses in the hub 14. The pins 36 are arranged with their axes parallel to the axis of the drive and driven shafts; and the pins 36 are angularly spaced about the axis of the hub. These pins 36 are provided with tapered ends 37 designed to fit into corresponding angularly spaced recesses 39 in the gear carrier 33. The pins 36 extend through aligned apertures in the hub and in the ring 34. In one extreme position they are entirely withdrawn from engagement with the gear carrier 33, while in the other extreme position they engage into the gear carrier to hold the hub and gear carrier interlocked for rotation in unison.

The hub 14 is provided with radially extending slots 40 which extend outwardly from each pin receiving recess. Actuating pins 41 are positioned in each of these slots 40 by means of which the pins 36 are moved longitudinally between the extreme positions described. The outer ends of the actuating pins 41 extend through an axially slidable ring 42. Heads 43 on the pins 41 limit the inward insertion of the pins 41, and a retaining band 44 encircles the ring 42 and extends over the heads 43 to hold the actuating pins in place.

The ring 42 is externally grooved at 45 to receive a relatively movable ring 46 by means of which the ring 42 may be moved axially of the hub 14. The ring 46 is pivotally connected to a slide yoke 47 in a manner not shown, but well known in the art. The slide yoke is pivoted at 49 to a fixed pivot. An arm 50 is formed as a part of the yoke 47, and is pivotally connected at 51 to an operating lever 52. The yoke and arm act as a bell crank, the operating rod or lever 52 acting to shift the yoke from one position to another. Movement of the yoke causes movement of the ring 46; movement of the ring 46 causes movement of the ring 42; movement of the ring 42 causes movement of the actuating pins 41; and movement of the actuating pins 41 causes longitudinal sliding of the pins 36 into which the ends of the pins 41 engage.

Spaced from the gear carrier 33, and extending parallel thereto, I provide a second gear carrier disc 53. At angularly spaced intervals about the gear carrier 33, I provide projecting portions 54 which extend toward the carrier disc 53. These large bosses or projecting portions have apertures 55 therein to receive securing nuts 56 of securing bolts 57. The carrier disc 53 is provided with complementary bosses 59 which contact the bosses 54. The securing bolts 57 are threadably engaged in the bosses 59 of the gear carrier disc 53. Thus, at angularly spaced points, the gear carrier discs 33 and 53 contact one another, and are secured in position by the bolts 57.

Needle bearings 60 are interposed between the gear carrier discs 33 and 53. The double gear units 61 are supported on the bearings 60. Figures 4 and 5 illustrate the manner in which the gear carriers and gears are arranged within the housing. In the form shown, three gear units 61 are arranged, which may or may not be spaced 120° apart, about the center of the transmission. Between the gear units 61, the connecting bosses 54 may be seen substantially filling the space. The bosses 54 may be connected as shown in Figure 5, if desired.

The double gear units 61 include two gears 62 and 63 of different diameter. The gear 62 is positioned to mesh with a sun gear 64 integral with the driven shaft 11. The gear 64 thereby forms the connection through which action of the shaft 11 is begun.

Adjacent to the planet gear carrier 53 I provide a supporting disc 65 which terminates in a cylindrical flange 66. The flange 66 supports a substantially cylindrical sleeve 67 having a ring gear 69 integral therewith. A peripheral flange 70 extends outwardly from the end of the sleeve 67 and a circular flange 71 is secured thereto by bolts 72. The circular flange 71 terminates in a ring gear 73 which is of a smaller diameter than the ring gear 69. It will be seen that the ring gears 69 and 73 operate in unison as they are bolted together and these ring gears may rotate relative to the sun gears and the planet gear carriers.

Adjacent the ring gear supporting disc 65. I provide a third planet gear carrier 74 which is somewhat smaller in form to the second planet gear carrier 53. The end of the housing 21 terminates in a disc 75 which forms the fourth gear carrier and which rotates in unison with the third planet gear carrier 74. Angularly spaced bosses 76 on the gear carrier 74 cooperate with corresponding bosses 77 on the end plate 75 to provide a spacing means to hold the third and fourth planet gear carriers 74 in proper spaced relationship. Studs 79 are threaded into the end 75 of the housing 21 and project through the bosses 76 in the planet gear carrier 74 and nuts 80 on the studs 79 hold the planet gear carrier 74 and 75 from relative rotation. The angular relationship of the bosses 76 and 77, and the gears carried by the gear carriers 74 and 75 may be seen in Figure 4.

The planet gear carriers 74 and 75 support ball or roller bearings 81 and 82, respectively, which support the stub shaft ends 83 and 84, respectively, of the double gear units 85. The double gear units 85 include a smaller diameter gear 86 and a larger diameter 87 which are integrally connected together. The larger diameter gear 87 is in constant mesh with the ring gear 69.

Three relatively rotatable sun gears are provided in addition to the sun gear 64 integral with the driven shaft 11. The first of these sun gears 89 is formed on the end of a sleeve 90 encircling the shaft 11. A brake disc 91 extends outwardly from the sleeve 90 and is splined thereto to move in unison therewith. An offset 92 in the disc 91 provides a space for a disc interconnecting means that will be later described in detail. The disc 91 terminates in a brake drum 93 engaged by a brake band 94 in a manner which will be later described.

A sun gear 95 is integrally secured to a sleeve 96 encircling the sleeve 90 to which is keyed the hub 97 of a brake drum disc 99 terminating in a brake drum 100. A brake band 101 encircles the brake drum 100 and is operated in a manner which will be later described in detail. The sun gear 95 is in constant mesh with the small diameter gear 86 of the double gear unit 85.

A sun gear 102 is secured integrally to a sleeve 103 encircling the sleeve 96 which in turn is secured to the brake drum disc 104 terminating in the brake drum 105. A brake band 106 encircles the brake drum 105 and is operated in a manner which will be later described in detail.

Between the offset portion 92 of the brake drum disc 91 and the hub 97 of the brake drum 99, I provide an interconnecting or interlocking means which is controlled by a disc 107 terminating in a brake drum 109 about which is positioned a brake band 110. The manner in which the interconnecting means which may be used to cause rotation of the sun gears 95 and 89 in unison will now be described.

With special reference to Figure 3 of the drawings, it will be noted that the driven shaft 11 is encircled by the sleeve 90. The sleeve 96 encircles the sleeve 90 and is secured by a keyed or splined connection to the hub 97 of the brake drum disc 99. The offset portion 92 of the brake drum disc 91 is of somewhat larger diameter than the hub 97 and provides a space in which three split rings are accommodated.

The innermost split ring 111 terminates in outwardly projecting ears or lugs 112 spaced on opposite sides of a lug 113 mounted upon the disc 107. A split collar 114 is also mounted on the disc 107 and separates the inner ring 111 from an outer ring 115. The outer ring 115 is provided with hook ends 116 and 117 which are positioned to engage the ends of split collar 114. Movement of the disc 91 in one direction will tend to move one end 116 of the ring 115 against the end of the collar 114, while the movement of the disc 91 in the opposite direction will tend to move the hook end 117 of the ring 115 against the other end of the collar 114. The ends 119 of the ring 115 are cut on an angle to fit the corresponding angle of the lug 112.

In operation the rings 111 and 115 act to provide a means of connecting the hub 97 with the offset portion 92 of the brake disc 91. When the brake band 110 is in engagement with its brake drum 109, the disc 107 is held from rotation, and accordingly the lug 113 and the split collar 114 are held from rotation. In such an instance the lug 112 on one end of the split ring 111 engages the lug 113 due to the dragging action of the hub 97 thereagainst. However, as the hub 97 tends to rotate in a counter-clockwise direction, the forward end of the band in the rotation of the same engages the lug 113 and prevents the band 111 from wrapping tightly around the hub 97. Simultaneously the disc 91 tends to rotate in a clockwise direction causing the hook end 116 of the outer ring 115 to engage the corresponding end of the split collar 114. Thereby the outer band 115 is prevented from expanding against the offset portion 92 of this disc.

When this disc 107 is released and is free to rotate with the remaining elements the pressure of the lug 113 against the lug 112 on the end of the band 111 is released. This permits the band to engage the hub 97 more firmly and brings the opposite lug 112 on the other end of the band against the inclined end 119 of the hook end 117 of the band 115. In other words, movement of the bands or rings in opposite direction will tend to expand the band 115 and contract the band 111 so that the disc 91 and hub 97 will rotate in unison. Accordingly, when the brake band 110 is loosened on the brake drum 109, the sun gears 89 and 95 will rotate in unison.

In some instances it is desirable that the sun gear 89 operate in unison with the driven shaft 11. In order to accomplish this result, I provide a clutch designed to provide engagement between the driven shaft 11 and the brake drum disc 91 which is secured to the sun gear 89. It will be noted that the brake drum 93 is positioned to one side of the brake drum supporting disc 91. This provides a cylindrical recess within the drum 93 in which the clutch may operate. A sleeve 120 is mounted on the driven shaft 11 and is keyed to rotate therewith. Splined to the sleeve 120 I provide the hub 121 of the clutch disc 122. The clutch disc 122 is provided with a friction facing 123 in each side thereof. One friction facing 123 is designed to engage the face of the brake drum disc 91. The other friction facing 123 is designed to engage a ring 124 by means of which pressure may be applied. The ring 124 is parallel to the disc 91, and may be moved toward or away from the disc 91, being splined or keyed to the inner surface of the brake drum 93. Movement of the ring 124 toward the disc 91 causes the clutch disc 122 to be squeezed between the ring 124 and the disc 91, causing the disc 122 to rotate in unison with the disc 91. Movement of the ring 124 away from the disc 91 relieves the pressure and permits independent rotation of these parts.

A spring metal disc 126 encircles the hub 121, and is held within the brake drum 93 by means of a split spring ring 127 which is held in place by an internal flange 129 within the drum 93. The disc 126 is provided with a series of radially extending slots 130, through which extend the shanks of double headed retaining pins 131. The pins 131 are slidable in the slots 130 in a radial direction with respect to the disc 126; and when in their outermost position engage in sockets 132 formed integral with the ring 124. The pins 131 are held engaged in the sockets by means of a spring retaining ring 133 engaging the inner surface of these pins 131. The pins 131 thus removably connect the ring 124 and the disc 126.

A sleeve 134 encircles the hub 121, and is longitudinally slidable with respect thereto. A flange 135 is provided on one end of the sleeve 134, to engage interiorly of the disc 126. By means of a series of rings 136 which encircle the sleeve 134, a shifting sleeve 137 is secured to the sleeve 134. The shifting sleeve may rotate with respect to the sleeve 134, but moves longitudinally therewith. The means for longitudinally sliding this assembly in order to engage and disengage the clutch disc 122 will now be described in detail with special reference to Figure 6 of the drawings.

The entire transmission is encased within an outer casing 139. This casing 139 is formed in two parts to be easily removable. One end plate 140 thereof terminates in a cylindrical flange 141 which is bolted by bolts 142 to the cylindrical casing 143 which encircles the transmission in spaced relation thereto. An end plate 144 forms the end of the casing 143; and a bearing 145 in the end plate 144 supports the driven shaft 11.

A hydraulic cylinder 146 is secured adjacent the end plate 144 to a supporting spider 138 shown in Figures 1 and 2. A piston 147 within the cylinder 146 is secured by the piston rod 149 to a yoke 150, which moves in a radial direction with respect to the shaft 11 when actuated by the piston 147. The yoke 150 is pivotally connected to one end of a bell crank 151; and the other end of this bell crank 151 is pivoted to the shifting sleeve 137. The intermediate pivot 152 of the bell crank is connected by the link 153, which in turn, is pivotally connected at 154 to the end plate 144 or to the spider 138. Preferably, each of the bifurcated ends of the yoke 150 is connected to one of the bell cranks 151, to equalize the strain.

From the foregoing description, it will be clear that as the piston 147 moves downwardly in the cylinder 146, the bell cranks 151 will be rotated in a clockwise direction as viewed in Figure 6, sliding the shifting sleeve 137 to the right, and disengaging the clutch. As the piston 147 moves upwardly in the cylinder 146, the shifting sleeve 137 will be moved to the left, engaging the clutch plate by pressing the ring 124 against the clutch disc 122 and creating increased friction between this disc 122 and the ring 124 and the brake drum disc 91 by means of the spring 126.

The specific manner in which the brake bands 94, 101, and 108 are applied about their respective brake drums 93, 100, and 105 is not of particular importance in the present invention. In order to illustrate the manner in which this may be accomplished, however, attention is directed to Figure 7 of the drawings.

A cylinder 155 is secured to the spider 138 within the transmission housing. A piston 156 is provided within the cylinder 155, which is attached by the piston rod 157 to the arm 159 keyed to the shaft 160, pivotally mounted on the spider 138 of the housing 139 in any suitable manner. A crank 161 forms a part of the shaft 160, which terminates in a crank shaft 162. The crank shaft 162 engages in a yoke 163, pivoted at 164 to the shoe 158 secured to one end of the brake band 94. A spring 165 extends between the yoke 163 and a fixed lug 166 on the housing 139, tending to hold the brake band 94 released from its drum 93.

The dead end of the brake band 94 is connected by a bracket 167 to an adjusting stud 169 anchored in the housing 139. The tension of the band may be adjusted by the stud 169 externally of the housing 139 in an obvious manner.

When the piston 156 lowers in the cylinder 155, the arm 159 rotates the shaft 160, rotating the crank 161, and pulling the brake band 94 in a clockwise direction, compressing or tightening the band 94 about its drum 93, and stopping rotation of this drum.

With special reference now to Figure 2 of the drawings, it will be noted that a cylinder 170 secured to the spider 138 contains a piston 171 which operates through the rod 172, arm 173, shaft 174 supported by the spider 138, arm 175 and yoke 176 to tighten the band 101 about its drum 100. The brake band 101 is adjustably dead ended by the adjusting stud 177. Similarly, the cylinder 179 is fixed to the spider 138, and contains a piston 180 connected to a piston rod 181. The rod 181 acts through the arm 182, shaft 183 supported by the spider 138, arm 184, yoke 185, and shoe 186 to tighten the band 106 about its drum 105. The band 106 encircles the drum 105 in a direction opposite to the direction of operation of the bands 94 and 101, and is dead ended by the adjustment stud 187.

A hydraulic cylinder 189 is secured to the fixed spider 138, and contains a piston 190. The piston 190 acts through a piston rod 191 pivotally connected to an arm 192, which arm is rotatable with a shaft 193 supported by the spider 138. A second arm 194 is rotatable with the shaft 193 and engages the yoke 195 which is pivoted to the brake band shoe 196 on one end of the brake band 110 encircling the brake drum 109. A spring 197 tends to hold the band 110 released, and the braking pressure is applied to the band by the cylinder and piston.

The various cylinders 146, 155, 170, 179, and 189 are operated hydraulically by a control device best illustrated in Figures 8, 9, 10, and 11 of the drawings. The cylinder 146 is controlled by a conduit pipe 199 best illustrated at the top of Figure 1 of the drawings which connects this cylinder to the outlet port 200 of the control B. The cylinder 155 is controlled by operation of a conduit pipe 201 leading to the outlet port 202 of the control B. The cylinder 170 is actuated by pressure through conduit 203 communicating with a port 204 in the control B. A cylinder 179 is controlled by fluid pressure through a conduit 205 leading to the port 206 of the control B. Pressure through any of these various conduits 199, 201, 203, or 205 actuates the various cylinders to which it is connected. The cylinder 189 is controlled by fluid pressure through a suitable conduit connected to the port 208 of the control B.

The control B is provided with a reservoir 207 which is connected by an inlet 209 through the passage 210 to the inlet of the hydraulic pump 211. The pump 211 may be of any desired design arranged to force liquid under pressure into a pump outlet 212 which is provided with a check valve 213 to prevent pressure from entering the pump from the discharge thereof. The check valve 213 is urged by a spring 214 into the outlet and the tension of the spring may be adjusted by shortening or lengthening the spring within the threaded socket 215. The pump 211 may be driven by a motor driven shaft 218.

A passage 216 communicates with the discharge passage 212 when the check valve 213 is open and this passage 212 leads to an inlet port 217 of a rotary selective valve 219. The rotary valve 219 is provided with a series of openings therethrough which permit the oil under pressure to pass through the control valve, to enter any of the outlet ports 200, 202, 204, 206, and 208. Return passages 220, and 221 communicate with the reservoir 207 so that as the valve 219 is rotated, certain of the ports 200, 202, 204, and 206 may be communicated with the high pressure liquid, whereas others of the cylinders are connected by external grooves 222 to the various exhaust passages 219, 220, and 221. Obviously when one of the cylinders 146, 155, 170, 179 or 189 are connected to the exhaust passages the brake bands controlled by oil pressure in these various cylinders are released through action of the springs, such as the spring 165 or by the similar springs 197, 223, or 224. The spring disc 126 acts to return the piston 147 in the cylinder 146.

Rotation of the rotatable valve element 219 is accomplished by the toothed rack 225 which is in mesh with the pinion 226 on the rotatable valve 219. A spring 227 tends to rotate the rotary valve 219 toward its starting position so that rotation of this valve tends to increase the tension of the spring. The rack 225, thus tends to rotate the valve 219 toward a low speed ratio position of the transmission at all times.

In order to provide a means of bypassing excess oil to prevent injury to the pump 211, I provide a relief oil passage 230 with the oil inlet 210 to the pump 211. A check valve 231 is urged by the spring 232 into closed position so that no oil from the pump inlet 210 may flow into the return passage 230. However, if the pump 211 provides too great pressure or a greater pressure than is desirable within the pump the check valve 231 will compress the spring 232 and permit the excess oil to be returned to the inlet passage 210 of the pump 211. The plunger portion 233 of the check valve 231 is cut away to permit oil to pass freely through the inlet passage 210 from the reservoir connection 209.

A second compensating pump 234 is connected to the pump 211 to rotate therewith and is of considerably smaller size than the operating pump 211. The pump 234 is connected by an inlet passage 235 to the reservoir 207 and the outlet of the pump 234 is connected to an outlet port 236 positioned near one end of a cylinder 237. The cylinder 237 accommodates the piston 239 to which is attached the rack 225. Thus as oil pressure is forced by the pump 234 through the inlet port 236 of the cylinder 237 the rack 225 will be moved to the right as illustrated in Figure 9, rotating the pinion 226 in a clockwise direction and thus rotating the rotary valve 219 to control the transmission A. The cylinder 237 is provided with an adjacent smaller cylinder 240 which is parallel to the cylinder 237. A series of escape openings 241 extend through the wall of the smaller cylinder 240 and through aligned apertures 242 in the cylinder 237. As the piston 239 moves to the right as illustrated in Figure 9, a greater number of the openings 242 are exposed, for a purpose which will be described in detail.

In order to maintain somewhat of a balance between the speed of the engine and the output of the compensating pump 234, I provide an escape valve 243 which is operated in conjunction with the foot throttle of the internal combustion engine with which the transmission is used. As the foot throttle is depressed, accelerating the engine, the valve 243 opens, to permit more of the liquid to escape through the escape passage 244 to the reservoir 207. The escape of the liquid through the valve 243 is not sufficient to prevent the building up of a pressure within the cylinder 237. The valve 243 serves to retard the movement of piston 239 to the right in accordance with the amount of depression on the foot accelerator. This allows the engine to run in each speed ratio at a higher rate of speed than when the accelerator is depressed lightly.

An elongated plunger 245 is slidably accommodated within the smaller cylinder 240, and is provided with rack teeth 246. A portion of the upper surface of the cylinder 240 is cut away, and a pinion 247 engages the teeth 246. The pinion 247 is mounted on the shaft 249 to rotate therewith; and this shaft 249 is rotatably mounted in a boss 250. The shaft 249 extends through the housing 251 of the control B, and may be rotated by any suitable operating handle. By operation of the handle, not shown, the shaft 249 is rotated, sliding the plunger to any point within limits in its cylinder 240.

Movement of the plunger 245 acts to control the gear ratio of the transmission by closing more or less of the openings 242 into the cylinder 237. The piston 239 will move to the right only until it uncovers a passage 242 not closed by the plunger 245. As soon as the piston 239 tends to move past this opening 242, the liquid under pressure within the cylinder 237 is exhausted therethrough until the piston again moves to the left sufficiently to virtually cover the open aperture 242. For example, with the setting of the plunger 245 illustrated in Figure 9 of the drawings, the piston 239 will move to the right until the fourth aperture 242 from the left end of the series of the apertures is partially uncovered, as the first three apertures of the series are closed by the plunger 245. When the piston 239 reaches this point, however, additional pressure tends to exhaust through this fourth aperture 242, and sufficient pressure to force the piston 239 farther to the right cannot be built up. It will be noted, however, that any speed ratio lower than that for which the plunger 245 is set may be obtained.

In order to hold the transmission in one set position or another, rather than to remain in intermediate positions for any great length of time, I provide a ball 252 which is urged by a spring 253 into any of a series of detents 254. The detents 254 are in the rack 225, and tend to hold the rack in any one of a series of set positions.

A lever 255 is pivoted at 256 to the housing 251, and a stop rod 257 is pivoted at 259 to the lever 255 to limit movement of the piston 239 in one direction. An arm 260 rotatable with lever 255 supports a cam follower 261 which engages a cam 262 on the shaft 249. The cam 262 is so shaped that the lever 255 is permitted to pivot only when the plunger 245 is moved near one extreme position. This prevents the piston 239 from moving or shifting the transmission into reverse when it is not necessary or desirable. In other words, the transmission may only be moved into reverse by a manual action of the control lever, and may not move into reverse accidentally.

As best illustrated in Figures 9, 10, and 11 of the drawings, a pair of spaced cams 263 and 264 are provided on the shaft 249 for operating the control rod 52 for operating the locking pins 36.

A yoke 265 is pivotally supported upon a stub shaft 266 and straddles the shaft 249 between the cams 263 and 264. A pin 267 on one arm of the yoke 265 engages the cam 264 and a second pin 269 on the other arm of the yoke 265 engages the other cam 263. The cams 263 and 264 are so arranged that the yoke 265 is oscillated from one extreme position to the other as the plunger 245 moves to the left as seen in Figure 9. From the position which it occupies in this figure, oscillation of the yoke 265 rotates the stub shaft 266 which in turn oscillates the arm 270 to which is pivoted the operating lever 52. Thus, the lever 52 is urged downwardly when the plunger 245 reaches a predetermined point in its movement manually engaging the pins 36 in the openings 39 in the gear carrier 33. The pumps 211 and 234 are driven by any suitable means, not illustrated in detail in the drawings.

Having now described the construction of the transmission and control means, I now desire to describe the operation of the device. Let us state for example, that the control lever on the operating shaft 249 is rotated to one extreme position, the pinion 247 pulling the plunger 245 to its extreme position to the left of the second opening 242 of the series of openings. When the plunger 245 is in this extreme position the cams 263 and 264 have oscillated the yoke 265 in a manner to urge the operating rod 52 downwardly into the transmission. This action pivots the bell crank 50 sliding the actuating pins 41 to the right as viewed in Figure 1 and thereby urging the pins 36 into their respective openings 39 in the gear carrier 33 and locking the gear carrier 33 for rotation with the drive shaft 10. Furthermore, in this position the cam 262 has released the cam follower 261 so that the piston 239 in the control cylinder 237 can move to the extreme left hand end of the cylinder.

The rack 225 in this position of the control has rotated the rotary valve 219 to a rotary position in which the fluid under pressure is transmitted to the port 204. This permits a flow of fluid under pressure to the cylinder 170 which moves the piston 171 therein and its piston rod acts through the arm 173, shaft 174, arm 175, and yoke 176 to tighten the brake band 101 about its drum 100. This action holds the sun gear 95 stationary. With the sun gear 95 held stationary, rotation of the drive shaft causes rotation of all of the gear carriers in unison as the gear carrier 33 is locked to the drive shaft by means of the pins 36. Power is then transmitted through the double gear unit 85 to the ring gear 69 which operates in unison with the ring gear 73. Thus the rotation of the ring gear 73 is controlled by holding the sun gear 95 stationary, and as the gear carriers supporting the double gears 61 rotate in unison with the drive shaft, a reverse rotation is transmitted from the gear 62 to the sun gear 64 on the driven shaft 11.

In other words, as the sun gear 95 is held fixed and as the gear carriers and all of the planet gears rotate at the same speed, the double gear units 85 revolve about the sun gear 95 which causes the ring gears 69 and 73 to rotate in a set relation thereto. The sun gear 64 on the driven shaft is revolved in a reverse direction faster than it is carried forward by the transmission, acting to rotate the driven shaft 11 in a reverse direction.

By rotating the manual control shaft 249 slightly, the plunger 245 is moved beyond the first set of apertures and closes off this first set of apertures. Simultaneously the piston 239 and the pin 257 are moved to the right by the action of cam 262, rotating the rotary valve 219. When in the next position of the valve 219, the pressure from the pump 211 is returned to the reservoir 207. In this position of the valve 219, no fluid under pressure is directed to the transmission, and the transmission merely idles about its driven shaft. This is neutral position of the transmission.

Further rotation of the valve 219 causes the transmission to move into numerous successive gear ratios which gradually increase. These various speeds I have termed superlow, low, overlow, superintermediate, intermediate, overintermediate, high, overdrive, and superoverdrive, respectively. The action which takes place when the transmission is in each of these speeds will now be outlined.

For each successive speed forward, the control handle on the shaft 249 is pivoted slightly, sliding the plunger 245 to the right as viewed in Figure 9 of the drawings. The plunger 245 is moved past the next successive opening 242, which prevents the escape of liquid under pressure within the cylinder 237 until the piston 239 moves farther to the right. This permits any speed ratio less than that at which the transmission is set to be obtained when desired; but limits the movement of the piston 239 to the right. In other words, when the plunger 245 is moved to set the transmission in intermediate gear, the piston 239 may move to the right until the transmission is in intermediate; but at this point an increase in pressure in the cylinder 237 will allow liquid to exhaust, so that the transmission will not move into high or overdrive. This action is provided so that the engine may be used as a brake while going down grade with the vehicle.

As the piston 239 moves to the right a step at a time, the rotary valve 219 is rotated. Thus there is a definite position of the valve 219 for each gear ratio listed above.

When the valve 219 is in position for superlow, this valve 219 directs fluid to the cylinder 179, moving the piston 180 outwardly, and acting to tighten the brake band 106 upon the brake drum 105. This stops the sun gear 102 from rotation. The double gear 85 is then caused to revolve about the sun gear 102. By means of the double ring gear 69, 73, movement is transmitted to the double gear unit 61 which causes rotation of the sun gear 64 on the driven shaft 11. The relative rotation of the gear units 85 and 61 in the transmission illustrated provides a forward rotation of the driven shaft of 3.95 to 1 with respect to the driving shaft 10.

When the valve 219 is in the position for low gear, the valve directs fluid under pressure to the cylinder 155, releasing pressure in the cylinder 179. This fluid moves the piston 156 to tighten the band 94 about the brake band drum 93. The sun gear 89 is then held stationary. The double gear unit 61 is then caused to rotate about the sun gear 89, causing the gear 62 of this unit to rotate the sun gear 64 on the driven shaft 11 at a speed ratio of 2.78 to 1 in the transmission illustrated, with respect to the drive shaft 10.

With the valve 219 set to overlow position, the cylinders 179 and 155 are both subjected to fluid pressure. This acts to tighten both the brake bands 94 and 106 about their respective brake drums 93 and 105, arresting the sun gears 89 and 102 from rotation. The gear unit 85 is caused to revolve about the gear 102 producing a certain rotation of the ring gear 69, 73. Simultaneously, the double gear 61 is caused to revolve about the sun gear 89. This action transmits to the driven gear 64 a speed ratio of 2.44 to 1 in the driven gear with respect to the drive shaft 10, in the transmission illustrated.

When the valve 219 is set to superintermediate position, as pressure is released from the cylinders 179 and 155, no pressure is transmitted to the cylinder 189, actuating the piston 190. This action releases the brake band 110 from its drum 109, acting in the manner previously described to interlock the sun gears 89 and 95 for rotation in unison. This interlocking action produces a resulting rotation of the ring gear 69, 73 and of the double gear unit 61 which will drive the driven shaft 64 at a speed ratio of 2.18 to 1 with respect to the drive shaft in the particular transmission illustrated.

With the valve 219 set to intermediate position, fluid under pressure is transmitted to the cylinders 155 and 170, acting to hold the sun gears 89 and 95 from rotation. The gear 86 of the double gear unit 85 is caused to revolve about the gear 95, producing a certain rotative speed of the ring gear unit 69, 73. At the same time, the gear 63 of the double gear unit 61 is revolved about the sun gear 89, which will provide a resultant forward speed ratio in the driven gear 64 of 1.46 to 1 with respect to the drive shaft, in the particular transmission illustrated.

With the valve 219 set into overintermediate position, fluid is directed to the cylinder 179. This causes the brake band 106 to be tightened about the drum 105. Through the previous two speeds the brake band 110 has remained released from the drum 109. This action causes rotation of the sun gear 102 to be arrested, and causes the sun gears 89 and 95 to be interlocked to rotate in unison. The gear unit 85 is forced to revolve about the gear 102, and to provide a definite rate of rotation of the ring gear unit 69, 73 and of the sun gears 89 and 95. This action produces a rate of rotation of the driven gear 64 which is 1.20 to 1 with respect to the drive gear in the particular transmission illustrated.

When the valve 219 is set in position for high gear, the fluid under pressure to cylinder 146 is now released, which engages the clutch disc 122 with the disc 91, thereby causing sun gear 89 to rotate with the driven shaft. This action tends to stop rotation of the gear unit 61, and the entire transmission rotates as a unit, the driven shaft rotating at the same speed as the drive shaft.

When the valve 219 is set into position for overdrive, the fluid under pressure is transmitted to the cylinder 179. This action tightens the band 106 about the drum 105, arresting movement of the sun gear 102. This causes the gear 87 of the double gear unit 85 to travel about the gear 102 at a predetermined rate. However, as the gear unit 61 cannot revolve about the sun gears 64 and 89, being locked to rotate in unison therewith, the gear carrier 33 is forced to travel faster than the other gear carrier, resulting in driving the driven shaft at a speed greater than the speed of the drive shaft, in a ratio of 1 to 1.33⅓ in the transmission illustrated.

When the valve 219 is set into position for superoverdrive, fluid under pressure is released from cylinder 179 and transmitted to cylinder 170, acting to hold the brake drum 100 from rotation, and holding the sun gear 95 stationary. Much the same action as that described in connection with overdrive then takes place. The gear unit 61 is locked from rotation with respect to the driven gear 64 by the locking of the sun gear 89 to the driven shaft 11. This necessitates the gear carrier 33 moving faster than the drive shaft, as the gear 86 of the gear unit 85 rotates about the fixed sun gear 95 at a predetermined rate of speed. The speed ratio between the driven shaft and the drive shaft in the transmission illustrated is 1 to 1.54, the driven shaft travelling faster than the drive shaft.

It will be understood that in the control unit B, the major portions of the apertures 242 may be omitted if it is so desired. The transmission will then assume the speed ratio best suited for the conditions of travel. When it is desired to make use of the compression of the motor as a brake while decelerating or travelling down a hill, the control illustrated is of advantage.

With special reference to Figure 12 of the drawings, a modified form of interlocking means will be described which may be used in the place of the previously described interlocking means best illustrated in Figure 3. In this construction the numeral 91 indicates, as in the other previously described construction, the brake drum disc connected to the sun gear 83, while the numeral 97 indicates the hub of the brake band disc 99 of the brake band 100. Interposed between the brake drum disc 91 and the disc 99 is the brake drum disc 275 which takes the place of the brake drum disc 107 previously described. The disc 275 may be considered to terminate in a brake drum 109 upon which the brake band 110 operates. Mounted upon the disc 275 I provide a lug 276 and a substantially Z shaped projection 277. These projections extend into the cylindrical space between the hub 97 and the offset portion 92 of the brake drum disc 91.

A split ring 279 encircles the hub 97 and has a tendency to wrap around this drum. The end of the ring 279 is provided with an inclined race 280 upon which may operate a ball or roller 281. The roller 281 is urged by a plunger resiliently actuated by a spring 283 recessed in a lug 284 on the outer surface of the ring 279. Obviously when the hub 97 is rotating in a counterclockwise direction and the brake drum disc 91 is travelling in a clockwise direction, the roller 281 will be urged by the plunger 282 between the inclined portion 280 of the ring 279 and the inner surface of the offset portion 92 tending to cause the hub 97 and the brake drum disc 91 to rotate in unison.

In order to prevent operation of these two elements in unison a rocker arm 285 is pivoted at 286 to the end of the ring 279. Opposite the end bearing the incline 280 a pivoted finger 287 is pivoted at 289 to the rocker arm 285 and extends between the substantially Z-shaped projection 277 and the surface of the portion 92. In one pivoted position of the rocker arm 285 the finger 287 engages against the ball or rocker 281 urging the same down the incline and preventing the rocker from locking these two elements from relative rotation.

In order to operate the rocker arm 285 it is only necessary to stop rotation of the brake drum disc 275 by engaging the brake band 101 about the brake drum 100. When the disc 275 is held from rotation, one end of the Z-shaped projection 277 engages an end of the rocker arm 285 sliding the finger 287 against the roller 281 and releasing the same from engagement with the inner surface of the offset portion 92, thereby permitting independent rotation of the hub 97 and the brake drum disc 91. As soon as the band 110 is released, however, a pressure against the rocker arm 285 is released, allowing the finger 287 to slide back into the position illustrated in Figure 12 and permitting the plunger 282 to urge the roller 281 into interlocking position as shown.

In Figure 13 of the drawings I disclose a typical installation for my transmission which shows the manner in which the transmission may be conveniently used on a tank or tractor C. Figure 13 discloses the end of a power unit, such as an internal combustion engine showing the fly wheel 290 and the drive shaft 291. A double bevel gear unit comprising a bevel gear 292 and a bevel gear 293 is rotatably mounted upon the drive shaft 291 and may be shifted longitudinally of the drive shaft by any suitable shifting mechanism 294. The bevel gear 292 is designed to engage a co-operating bevel gear 295 in one position of the bevel gear unit in order to drive the power take-off pulley 296. In the other position of the bevel gear unit, the bevel gear 293 engages a bevel gear 297 and is rotatably mounted upon a drive shaft not shown in detail in the drawings. A transmission A is mounted on each side of the center on each of the transverse drive shafts, each designed to deliver power to a driven shaft 299 upon which is mounted a drive pinion 300. Each pinion 300 engages a gear 301 which is connected by a sleeve 302 to a chain sprocket 303 or any other suitable connection to the wheel or treads of the tractor or tank.

A control B is provided for each transmission which is operated in the manner previously described by an operating lever 304. By operation of the levers 304 each of the transmissions A may be individually operated and may supply the same speed ratio to both of the drive sprockets 303 or may, if desired, provide the same speed to both of these sprockets. Thus, the drive sprockets 303 may be actuated at the same speed or at any individual speeds.

In Figure 14 of the drawings I disclose one form of control device operated by the control rod 304. The control rod 304 is keyed to a planet gear carrier 305 supporting a pair of planet gears 306 which mesh with gear teeth 307 on the end of the rotary control valve 309. The pressure from the pump 211 is supplied to the rotary valve 309 through the intake port 310 and may deliver fluid under pressure to any of the cylinders 311, 312, 313, 314, or 315. The cylinders 311, 312, 313, 314, and 315 are equipped with pistons similar to those shown in Figure 15 and which will be later described. In this type of construction, the valve unit is directly connected to the cylinders operating the various brake bands eliminating the need for pipes or conduits. The cylinders 311, 312, 313, 314 and 315 may be spaced the same as the brake bands operated thereby, thus eliminating all need of conduits or piping. Such a construction is of particular value when the transmission is used on tanks and the like.

If the control of Figure 14 were to be used with the transmission and arranged as in Figures 1 and 2 of the drawings, the cylinders 311, 312, 313, 314, and 315 would form exhaust ports. The exhaust port 311 is then connected to the cylinder 179 in the transmission to operate the piston 188. The port 312 is connected to the cylinder 178 to operate the piston 177. The port 314 is connected to the cylinder 155 to operate the piston 156. The port 315 is connected to the cylinder 146 to operate the piston 147. The port 313 is connected to the cylinder 189 to operate the piston 190. It will be obvious that by pivoting the control lever 304, liquid may be distributed to any of the desired control units for operating the transmission A to provide any desired speed ratio. In Figure 15 of the drawings I disclose a slightly modified form of brake applying means by which the brake drums 93, 100, 105, and 109 may be held from rotation. This figure does not disclose a complete cross-section through the transmission as it will be understood that any of the drums may be held from rotation by this means. As shown in this figure the brake drum 316, which may be any of the brake drums previously described, may be engaged by a pair of oppositely disposed brake shoes 317 equipped with a brake band surface 319. The shoes 317 are pivotally supported at 320 by a U-shaped support 321. A spring 322 tends to hold the brake shoes 317 spaced from the drum 316. A lever 323 pivoted at 324 to the fixed bracket 325 is pivoted at 326 to the brake shoes 317. Movement of the levers 323 is controlled by pistons 327 within the cylinders 329. When hydraulic pressure is introduced through the conduit 330, the pistons 327 operate the levers 323 to apply the brakes to the brake drum 316.

Figures 17, 18, and 19 of the drawings disclose modified forms of construction showing different manners in which the ring gears may be connected to the double gear units. In these figures the double gear units 61, including gears 62 and 63 are shown connected with an integral ring gear. In Figure 17 the integral ring gears 331 and 332 are shown in mesh with the gears 62 and 87, respectively. In Figure 18 the ring 333 is connected to ring gear 334. Ring gear 333 is in mesh with planet gear 62 of the double gear unit 61, and the ring gear 334 is in mesh with planet gear 86 of the double gear unit 85. In Figure 19 the ring gear 335 is connected to the ring gear 336, and these ring gears are shown connecting the gears 63 and 86. Thus these various combinations of ring gear structure may be used in place of the connected ring gears 69 and 73 if it is desired to provide various speed ratios for different constructions.

Figure 20:
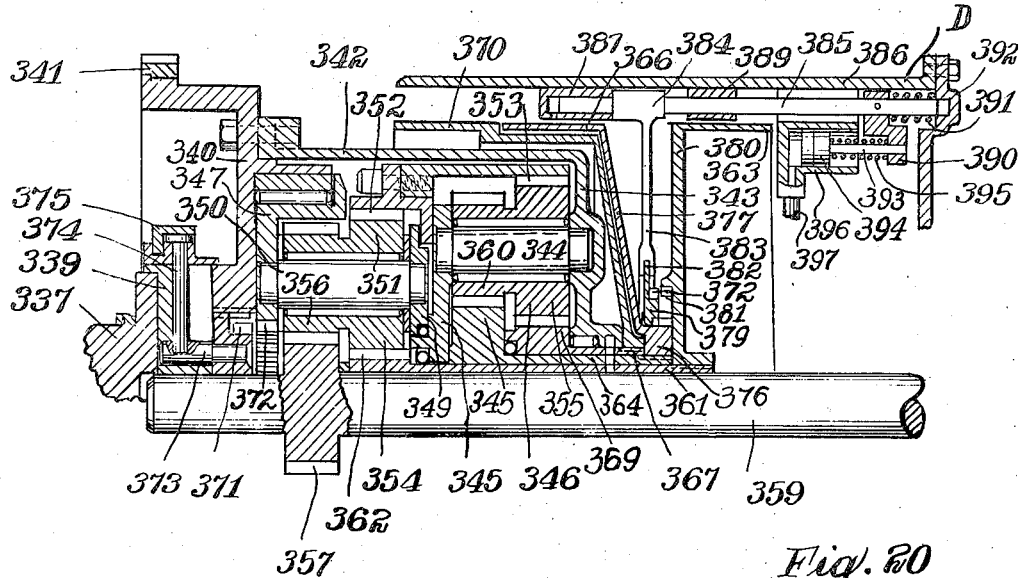
Figure 20 is a sectional view through a slightly modified form of transmission, showing interlocking clutches of a somewhat different form from that previously disclosed.

In Figure 20 of the drawings I disclose a transmission construction which is identical in principle to the transmission A previously disclosed. The transmission D is provided with a drive shaft 337 bolted through the ring 339 to the end plate 340, supplied upon its outer periphery with a gear ring 341 by means of which the motor can be started. The hollow cylindrical casing 342 is connected to the end plate 340, terminating in an end plate 343 which acts as a planet gear carrier.

Bearing shafts 344 extend between the end plate 343 and the gear carrier plate 345 bolted thereto; and double gear units 346 are mounted thereupon, being supported by needle bearings. A second set of gear carrying discs 347 and 349, bolted to rotate in unison, support stud shafts 350 which support the double gear unit 351, which are spaced from the shafts 350 by needle bearings. A ring gear unit comprising ring gears 352 and 353 engage the gear 354 of the double unit 351, and the gear 355 of the double gear unit 346. The gear 356 of the gear unit 351 engages the driven gear 357 on the driven shaft 359 while the gear 360 of the double gear unit 346 engages its sun gear.

A sleeve 361 rotates on the driven shaft 359, and supports a sun gear 362 engageable with the gear 351. A brake drum 363 is keyed to the sleeve 361 and is operated by a suitable brake band. A sleeve 364 encircles the sleeve 361, and bears a sun gear 365 which engages the gear 360 of the double gear unit 346. A brake drum 366 is connected to the sleeve 364, operated by a suitable brake band. A sleeve 367 encircles the sleeve 364, and bears the sun gear 369 which engages the gear 355 of the double gear unit 346. A brake drum 370 is keyed to the sleeve 367, which may be engaged by a suitable brake band as described in the transmission A.

The gear carrier discs 347 and 349 may be made to rotate with the drive shaft 337. A clutch gear 371, best illustrated in Figure 21 of the drawings, is slidable upon the end of the driven shaft 359, into or out of engagement with a complementary clutch gear 372 on the gear carrier 347. Pins 373 engage the gear 371 to slide the same. The pins 373 are moved by radially extending pins 374, movement of which is controlled by a sliding ring device 375 similar to that previously described.

In order to interlock the sun gears 362 and 365 for rotation in unison, I provide on the hub 376 of the brake drum disc 377 of the brake drum 366 a slidable gear 379 which is splined or keyed to the hub 376. This gear 379 is a clutch gear similar to the clutch gear 372 illustrated in Figure 21 of the drawings. On the disc 380 of the brake drum 363 I provide a complementary gear 381. A flange 382 extends outwardly from an edge of the gear 379 which is engaged by the bifurcated end 383 of the gear shifting bracket 384. By movement of the shifting bracket 384 the position of the gear 379 may be moved from engaging position in which the gear 379 engages the gear 381, causing rotation of the sun gears 362 and 365 in unison.

The shifting bracket 384 is slidably mounted on a shaft 385 supported by the enclosing housing 386 of the transmission D. The shaft 385 slides in bearings 387 and 389 on the housing 386. A bracket 390 is mounted on the shaft 385 to slide therewith. A light spring 391 is mounted between the bracket 390 and the end plate 392 of the housing 386.

A piston rod 393 is secured to the bracket 390, and is slidable through an opening in the bracket. A piston 394 is mounted on the piston rod 393. A spring, which is substantially twice the strength of the spring 391, is indicated at 395 encircling the piston rod 393 between the piston 394 and the bracket. The piston 394 is mounted within a cylinder 396, which is connected by a suitable conduit 397 to the control unit B. The conduit 397 may be connected to the port 208 of the control unit.

When desired, fluid pressure enters the cylinder 396, forcing the piston 394 to the right as seen in Figure 20. Pressure upon the spring 395 moves the bracket 390 to the right, moving the rod or shaft 285, to the right as seen in Figure 20. This causes engagement of the gears 379 and 381, causing the sun gears 362 and 365 to rotate in unison.

Figure 21:
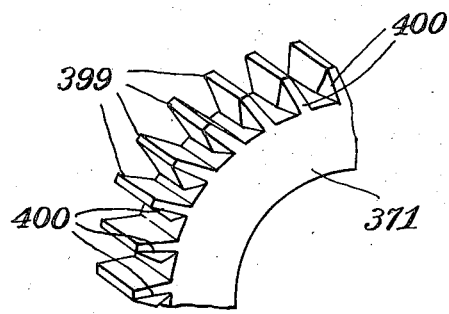
Figure 21 is a perspective view of one of the clutch gears used in connecting certain of the rotating parts together.

The clutch gears 372 and 379 are provided with teeth 399 which are provided with bevelled engaging edges 400 to lessen the shock of engagement. The form of these teeth is best illustrated in Figure 21 of the drawings. In general, the transmission D operates in a manner identical to the manner of operation of the transmission A, with the changes described.

From the foregoing description of my transmission A, it will be apparent that when it is desired to reverse the transmission, the lock band 110 is in engagement with the drum 109 and the cooperating elements as heretofore set forth will function to reverse the transmission.

With this transmission, I am able to secure nine forward speeds which may be described in a simple manner as follows:

What I term as "superlow" is obtained by causing the brake band 106 to engage the drum 105, which is the first speed.

The second speed, which I term "low" is obtained by locking the band 94 to the drum 93.

The third speed, which I term "overlow" is obtained by locking the bands 106 and 94.

The fourth speed, which I term "superintermediate" is obtained by locking the band 110 to the drum 109.

The fifth speed, which I term "intermediate" is obtained by locking the bands 101 and 94.

The sixth speed, which I term "overintermediate" is obtained by locking the band 106 and the band 110.

The seventh speed, which I term "high" is obtained by locking the clutch 122.

The eighth speed, which I term "overdrive" is obtained by locking the band 106 and the clutch 122.

The ninth speed, which I term "superoverdrive" is obtained by locking the band 101 and the clutch 122.

All of these speed changes are obtained in my transmission A without the disengagement of any of the intermeshing gears. When the transmission is operated by hand control, the different clutch bands, such as 106, 101, 110, 94, and the clutch 122, must be released by operating the hand control and selecting the different speeds. However, by the hydraulic control means which I have described heretofore, as the master controller B, in the operation of my transmission A, if the torque between the driving shaft 10 and the driven shaft 11 becomes too great for the applied power on the drive shaft 10, then the control B operates automatically to release brake bands and clutch means and to apply the proper brake band means so as to select the proper gear ratio between the driving member 10 and the driven member 11. The plunger 45 and the piston 239 are adapted to actuate to rotate the valve 219, which in turn rotates to a definite position for the gear ratio required. In this manner, my transmission A operates automatically when controlled by the hydraulic master control B.

Thus it will be apparent that I have provided an automatically operating transmission to automatically select the proper gear ratio between the driving element or drive shaft of the motor driving the transmission, and the driven member which is adapted to operate the motor vehicle or tractor or device being driven.

When the transmissions are used in pairs, as illustrated in Figure 13, and applied to a tractor or a flighting tank, such as is used in war, it may be desirable to operate the control members B of the respective transmissions by hand, and thus provide maneuverability to the tank by retarding the action of one transmission while speeding up the action of the other transmission, and vice versa, to operate the tank in any desired direction quickly and with the power necessary to carry the tank in the direction and at the speed desired.

In accordance with the patent statutes, I have described the principles of construction and operation of my transmission; and while I have endeavored to set forth the best embodiments thereof, I desire to have it understood that these are only illustrative of a means of carrying out my invention, and that obvious changes may be made within the scope of the following claims without departing from the spirit of my invention.

I claim:

1. In a transmission, a drive shaft, a driven shaft coaxial therewith, a pair of epicyclic gear systems connecting said shafts comprising three relatively rotatable sun gears coaxial with, and rotatable with respect to, said shafts, a pair of rotatable planet gear carriers, means connecting said carriers to rotate in unison, planet gear means on one of said carriers engaging one of said sun gears, second planet gears on the other of said carriers engaging a second of said sun gears, ring gears of relatively different diameters connected together and engaging said first and second planet gear means, pinion means rotatable with said first named planet gears engaging the third of said sun gears, means connecting said second planet gears to said driven shaft to rotate said driven shaft, and means for holding said one sun gear stationary.

2. In a transmission, a drive shaft, a coaxial driven shaft, three relatively rotatable sun gears rotatable with respect to and coaxial with said shafts, planet gear means engaging one of said sun gears, a ring gear engaging said planet gear means, a planet gear support, means connecting said support to said drive shaft to rotate therewith, second planet gears relatively larger than said first named planet gears engaging a second said sun gear, a second ring gear relatively larger than said first named ring gear engaging said second planet gears, said ring gears connected to rotate in unison, a second planet gear support, disengageable means connecting said second support to said drive shaft to rotate therewith, gear means rotatable with said first named planet gear means engaging the third of said sun gears, and gear means connecting said second planet gears to said driven shaft to rotate the same.

3. In a transmission, a drive shaft, a coaxial driven shaft, three relatively rotatable sun gears rotatable with respect to, and coaxial with, said shafts, planet gear means engaging one of said sun gears, planet gear supporting means connected to, and rotatable together with, said drive shaft, ring gear means engaging said planet gear means coaxial with, and rotatable with respect to, said shafts, a second ring gear secured to, and rotatable with, said first named ring gear, second planet gear means interposed between and engaging said second ring gear and the second said sun gear, a second planet gear support relatively rotatable with said shafts, overrunning clutch means between said drive shaft and said second gear support to rotate said second support at least as fast as said drive shaft, but holding said second support free to rotate faster than said drive shaft, gear means rotatable with said first named planet gear means and engaging the third of said sun gears, and cooperable gear means connecting said second planet gears to said driven shaft.

4. In a transmission, a drive shaft, a coaxial driven shaft, three relatively rotatable sun gears coaxial with, and rotatable with respect to, said shafts, planet gear means engaging one of said sun gears, a ring gear engaging said planet gear means rotatable upon, and coaxial with, said shafts, a planet gear support, means connecting said support to said drive shaft to rotate therewith, a second ring gear larger in diameter than said first named ring gear connected thereto and coaxial with said shafts, second planet gear means between and connecting said second ring gear and the second said sun gear, pinion means coaxial and rotatable in unison with said first named planet gear means engaging the third said sun gear, overrunning clutch means between said second gear support and said drive shaft, and selective means for holding both said sun gears stationary.

5. A transmission including a driving element, a driven element, a series of gear units interposed between said driving and driven elements, a gear carrier, each gear unit including a pair of sun gears coaxial with said gear carrier, a coaxial ring gear, a planet gear means, means connecting said units with said driving element and with said driven element, means for selectively arresting any of said sun gears from rotation, and hydraulic control means operating said selective arresting means, including means for automatically adjusting said hydraulic control means to select the proper gear ratio between said driving element and said driven element in accordance with the torque exerted against said driven element from said driving element.

6. In a transmission, a drive shaft, a coaxial driven shaft, three relatively rotatable sun gears rotatable with respect to, and coaxial with, said shaft, planet gear means engaging one of said sun gears, a first ring gear concentric with said shafts engaging said planet gear means, a second ring gear secured to said first ring gear, a second planet gear means interposed between, and meshing with, said second ring gear and the second of said sun gears, a second gear support for said second planet gear means, an overrunning clutch between said second gear support and said drive shaft to rotate said second gear support in unison with said drive shaft, pinion means coaxial with, and rotatable with, said second planet gear means, a gear on said driven shaft in mesh with said pinion means, pinion means coaxial with, and rotatable with, said first named planet gear means and engageable with the third of said sun gears, and clutch means selectively interlocking said driven shaft and the second of said sun gears.

7. In a transmission, a drive shaft, a coaxial driven shaft, three relatively rotatable sun gears coaxial with, and rotatable with respect to, said shafts, a double ring gear rotatable with respect to said shafts, said double ring gear comprising a first and second ring gear connected for rotation together, a first planet gear means between, and meshing with, one of said sun gears and said first ring gear, a second planet gear means between, and meshing with, the other of said sun gears and said second ring gear, a first planet gear supporting means connected to, and rotating with, said driven shaft, a second planet gear supporting means, and overrunning clutch interposed between said second supporting means and said drive shaft, and free to rotate faster, pinion means coaxial and rotatable with said first planet gear means, engaging the third said sun gear, pinion means coaxial and rotatable with said second planet gear means, gear means on said driven shaft engaging said pinion means, means for locking said one sun gear stationary, and clutch means selectively locking said other sun gear from rotation relative to said driven shaft.

8. In a transmission, a drive shaft, a coaxial driven shaft, three relatively rotatable sun gears rotatable with respect to, and coaxial with said shafts, planet gear means engaging one of said sun gears, planet gears supporting means connected to, and rotatable together with, said drive shaft, ring gear means engaging said planet gear means coaxial with, and rotatable with respect to, said shaft, a second ring gear secured to, and rotatable with, said first ring gear, a second planet gear means interposed between, and engaging said second ring gear and a second of said sun gears, a second planet gear support rotatable relative to said shafts, overrunning clutch means between said drive shaft and said second planet gear support to drive said second support at a speed equal to or greater than said drive shaft, pinion means rotatable in unison with said first named planet gear means engaging the third of said sun gears, brake means secured for rotation with each of said sun gears, means cooperable with said brake means to selectively hold any of said sun gears from rotation, pinion means coaxial with and rotatable with said second planet gear means, and gear means on said driven shaft engaging said pinion means.

9. In a transmission, a drive shaft, a coaxial driven shaft, three relatively rotatable sun gears rotatable with respect to, said shaft, a double ring gear comprising a first and second ring gear connected for rotation together, a first planet gear means between, and meshing with one of said sun gears and said first ring gear, a second planet gear means between and meshing with the other of said sun gears and said second ring gear, a first planet gear supporting means connected to and rotating with said drive shaft, a second planet gear supporting means, pinion means concentric with and rotatable with said second planet gear means, gear means on said driven shaft engaging said pinion means, pinion means coaxial with and rotatable with said first planet gear means, said last named pinion means engaging the third of said sun gears, brake means connected to each of said sun gears, means cooperable with said brake means to stop either of said sun gears from rotation, clutch means interposed between said driven shafts and one of said sun gears to cause rotation of said one sun gear together with said driven shaft, and means selectively connecting said second planet gear support to said drive shaft to cause rotation of said second planet gear support in unison with said drive shaft.

10. In a transmission, a drive shaft, a driven shaft coaxial with said drive shaft, three relative rotatable sun gears rotatably mounted on said driven shaft, a planet gear carrier secured for rotation with said drive shaft, planet gears rotatably supported by said planet gear carrier engageable with one of said sun gears, a second set of planet gears coaxial with, and rotatable with, a second of said sun gears, a second planet gear carrier relatively rotatable with respect to said planet gear carrier relatively rotatable with respect to said shafts, a third set of planet gears of different diameter from said first named planet gears on said second carrier engageable with the third of said sun gears, a first and second ring gear of unequal diameters connected for rotation in unison, means for holding said third sun gear stationary, fourth means for holding said third sun gear stationary, fourth planet gears coaxial with, and rotatable with, said third planet gears, gear means on said driven shaft engaging said fourth planet gears, and means connecting said second planet gear carrier to said drive shaft for rotating said second gear carrier therewith.

11. In a transmission, a drive shaft, a driven shaft coaxial therewith, a pair of epicyclic gear systems connecting said shafts comprising three relatively rotatable sun gears coaxial with, and rotatable with respect to, said shafts, a pair of rotatable planet gear carriers, planet gear means on one of said carriers engaging one of said sun gears, second planet gear means no the other of said carriers engaging the second of said sun gears, ring gears of relatively different diameters connected together and engaging said first and second planet gear means, pinion means coaxial with said first planet gear means and said second planet gear means, the third of said sun gears engaging one of said pinion means, gear means on said driven shaft engageable with the other of said pinion means, and means for holding said first sun gear stationary.

12. In a transmission, a drive shaft, a driven shaft, a planet gear carrier connected to said drive shaft for rotation thereby, a ring gear rotatable concentrically with said gear carrier, a pair of sun gears coaxial with said ring gear, planet gear means comprising a double gear unit comprising two gears connected for rotation in unison, said planet gear means being supported by said gear carrier, a second ring gear connected to said first named ring gear for rotation therewith, a pair of sun gears coaxial with said second ring gear, one of said last named sun gears being mounted on said driven shaft, a second gear carrier rotatable with respect to and coaxial with, said second ring gear, and second planet gear means carried by said second gear carrier, said second planet gear means comprising a pair of gears connected for rotation in unison, one of said gears of said last named pair engaging said second ring gear and one of said last named sun gears, and the other gear of said last named pair engaging the other of said last named sun gears.

13. In a transmission, a drive shaft, a planet gear carrier connected to said drive shaft for rotation thereby, a first pair of sun gears coaxial with said planet gear carrier, a first ring gear coaxial with said sun gears, first planet gear means rotatably mounted on said gear carrier, said planet gear means including a pair of planet gears connected for rotation in unison, one of said planet gears engaging said first ring gear and one of said first sun gears, and the other of said planet gears engaging the other sun gear of said pair; a second ring gear connected to said first ring gear, a second pair of sun gears coaxial with said second ring gear, a second planet gear carrier coaxial with said second ring gear, a second planet gear means mounted on said second planet gear carrier, said second planet gear means comprising a pair of gears connected for rotation in unison, one of said last named pair of gears engaging said second ring gear and one of said sun gears of said second pair, the other gear of said last named pair of gears engaging the other of said sun gears of said second pair, a driven shaft to which one of said sun gears of said second pair is secured, and means connecting said second gear carrier to said drive shaft in a manner to insure the rotation of said second gear carrier at the same rate of speed or at a greater rate of speed than said drive shaft.

14. In a transmission, a drive shaft, a first planet gear carrier connected to said drive shaft for rotation thereby, a first pair of sun gears coaxial with said planet gear carrier, a first ring gear coaxial with said first planet gear carrier, a first planet gear means carried by said first planet gear carrier comprising a pair of gears connected for rotation in unison; one of the gears of said pair engaging said first ring gear and one of said sun gears, and the other of the gears of said pair engaging the other of said sun gears; a second ring gear connected to said first ring gear for rotation therewith, a second pair of sun gears coaxial with said second ring gear, a second planet gear carrier coaxial with said second ring gear, a second set of planet gear means carried by said second planet gear carrier, said second planet gear means comprising a pair of gears, one of which meshes with said second ring and one of said sun gears of said second pair, and the other which meshes with the other of said sun gears of said second pair, a driven shaft driven by one of said sun gears of said second pair, and brake means for holding any of the remaining sun gears from rotation.

15. In a transmission, a drive shaft, a first planet gear carrier connected to said drive shaft for rotation thereby, the first pair of sun gears coaxial with said planet gear carrier, a first ring gear coaxial with said first planet gear carrier, a first planet gear means carried by said first planet gear carrier comprising a pair of gears connected for rotation in unison, one of said gears of said pair engaging said first ring gear and one of said sun gears, the other of the gears of said pair engaging the other of said sun gears, a second ring gear connected to said first ring gear for rotation therewith, a second sun gear coaxial with said second ring gear, a second planet gear carrier coaxial with said second ring gear, a second set of planet gear means carried by said second planet gear carrier, said second planet gear means comprising a pair of gears, one of which meshes with said second ring gear and said second sun gear, driven shaft and gear means connected to said driven shaft to rotate the same, meshing with the other of said gears of said second pair, brake means for holding any of the sun gears from rotation, and means connecting one of said sun gears with said driven shaft to rotate therewith.

16. In a transmission, a drive shaft, a first planet gear carrier connected to said drive shaft for rotation thereby, a first pair of sun gears coaxial with said planet gear carrier, a first planet gear means carried by said first planet gear carrier comprising a pair of gears connected for rotation in unison, one of the gears of said pair engaging said first ring gear and one of said sun gears, the other of the gears of said pair engaging the other of said sun gears, a second ring gear connected to said first ring gear for rotation therewith, a second sun gear coaxial with said second ring gear, a second planet gear carrier coaxial with said second ring gear, a second set of planet gear means carried by said second planet gear carrier, said second planet gear means comprising a pair of gears, one of which meshes with said second ring gear and with one of said sun gears of said second pair, a driven shaft and gear means connected to said driven shaft meshing with the other of said gears of said second pair, means connecting said second gear carrier to said driven shaft to drive said second gear carrier at a speed equal to or greater than said drive shaft, means for locking said second gear carrier and said drive shaft for rotation in unison.

17. In a transmission, a drive shaft, a first planet gear carrier connected to said drive shaft for rotation thereby, a first pair of sun gears coaxial with said planet gear carrier, a first ring gear coaxial with said first planet gear carrier, a first planet gear means carried by said first planet gear carrier comprising a pair of gears connected for rotation in unison, one of the gears of said pair engaging the first ring gear and one of said sun gears, and the other of the gears of said pair engaging the other of said sun gears, a second ring gear connected to said first ring gear for rotation therewith, a third sun gear coaxial with said second ring gear, a second planet gear carrier coaxial with said second ring gear, a second set of planet gear means carried by said second planet gear carrier, said second planet gear means comprising a pair of gears, one of which meshes with said second ring gear and with said third sun gear, a driven shaft, a gear connected to said shaft to drive the same, the other gear of said pair of gears of said second planet gear means engaging said gear connected to said driven shaft, and means interlocking two of said sun gears for rotation in unison.

18. In a transmission, a drive shaft, a first planet gear carrier connected to said drive shaft for rotation thereby, a first pair of sun gears coaxial with said planet gear carrier, a first ring gear coaxial with said first planet gear carrier, a first planet gear means carried by said first planet gear carrier, comprising a pair of gears connected for rotation in unison, one of the gears of said pair engaging the first ring gear and one of said sun gears, and the other of the gears of said pair engaging the other of said sun gears, a second ring gear connected to said first ring gear for rotation therewith, a third sun gear coaxial with said second ring gear, a second planet gear carrier coaxial with said second ring gear, a second set of planet gear means carried by said second planet gear carrier, said second planet gear means comprising a pair of gears, one of which meshes with said second ring gear and with said third sun gear, a driven shaft, a gear connected to said shaft to drive the same, the other gear of said pair of gears of said second planet gear means engaging said gear to said driven shaft, means interlocking a plurality of set sun gears for rotation in unison, and means locking said gear carriers for rotation with said drive shaft.

19. In a transmission, a drive shaft, a first planet gear carrier connected to said drive shaft for rotation thereby, a first pair of sun gears coaxial with said planet gear carrier, a first ring gear coaxial with said first planet gear carrier, a first planet gear means carried by said first planet gear carrier comprising a pair of gears connected for rotation in unison, one of the gears of said pair engaging the first ring gear and one of said sun gears, and the other of the gears of said pair engaging the other of said sun gears, a second ring gear connected to said first ring gear for rotation therewith, a third sun gear coaxial with said second ring gear, a second planet gear carrier coaxial with said second ring gear, a second set of planet gear means carried by said second planet gear carrier, said second planet gear means comprising a pair of gears, one of which meshes with said second ring gear and with said third sun gear, a driven shaft, a gear connected to said shaft to drive the same, the other gear of said pair of gears of said second planet gear means, engaging said gear connected to said driven shaft, and means interlocking one of the sun gears of said pair of sun gears with said third sun gear to rotate the same in unison.

20. In a transmission, a drive shaft, a first planet gear carrier connected to said drive shaft for rotation thereby, a first pair of sun gears coaxial with said planet gear carrier, a first ring gear coaxial with said first planet gear carrier, a first planet gear means carried by said first planet gear carrier comprising a pair of gears connected for rotation in unison, one of the gears of said pair engaging the first ring gear and one of said sun gears, and the other of the gears of said pair engaging the other of said sun gears, a second ring gear connected to said first ring gear for rotation therewith, a third sun gear coaxial with said second ring gear, a second planet gear carrier coaxial with said second ring gear, a second set of planet gear means carried by said second planet gear carrier, said second planet gear means comprising a pair of gears, one of which meshes with said second ring gear and with said third sun gear, a driven shaft, a gear connected to said shaft to drive the same, the other gear of said pair of gears of said second planet gear means engaging said gear connected to said driven shaft, brake means for holding any of said sun gears from rotation and interlocking means between one of the sun gears of said pair of sun gears and said third sun gear to cause rotation thereof in unison.

21. A transmission comprising a drive shaft, a gear carrier connected to said drive shaft for rotation thereby, a pair of sun gears coaxial with said gear carrier, a ring gear coaxial with said gear carrier, planet gear means carried by said gear carrier engaging said ring gear and said sun gear, a second ring gear secured to said first ring gear, a second planet gear carrier, a second sun gear, a driven shaft, a gear connected to said driven shaft to rotate the same, a second planet gear means meshing with said second ring gear, and said second sun gear, pinion means rotatable in unison with said second planet gear means and engageable with said gear means connected to said driven shaft, and means for interlocking said sun gears to cause the same to rotate in unison.

22. A transmission including a drive shaft, a gear carrier secured to said drive shaft for rotation therewith, a pair of sun gears coaxial with said gear carrier, a ring gear coaxial with said gear carrier and a planet gear means connecting said sun gears with said ring gear, a second ring gear connected to said first named ring gear, a sun gear coaxial with said second ring gear, a driven shaft, a gear means on said driven shaft coaxial with said second ring gear, a second planet gear carrier and planet gear means on said carrier connecting said last named sun gear and said gear on said driven shaft with said second ring gear, overrunning clutch means connecting said second ring gear carrier to said driven shaft to cause said second gear carrier to rotate at least as fast as said drive shaft, interlocking means between said drive shaft and said second gear carrier to lock said drive shaft and said second gear carrier from regular rotation, brake means connected to each of said sun gears whereby any of said sun gears may be selectively held from rotation, clutch means securing said last named sun gear to said driven shaft for rotation in unison, and interlocking means cooperable between said last named sun gears and one of said first named sun gears to cause rotation thereof in unison.

23. In a transmission, a drive shaft, a gear carrier secured to said drive shaft and extending beyond the end of the same, driven shaft coaxial with said drive shaft encircled by said gear carrier, a gear on said driven shaft, a first sleeve on said driven shaft, a sun gear on said first sleeve, a second sleeve encircling said first sleeve, a second sun gear on said second sleeve, a third sleeve encircling said second sleeve, a third sun gear on said third sleeve, a ring gear coaxial with said shafts, a planet gear means connecting, on said gear carrier, said ring gear with said third sun gear, pinion means rotatable with said planet gear means engaging said second sun gear, a second ring gear connected to said first named ring gear, a second gear carrier concentric with said shafts, planet gear means on said second planet gear carrier connecting said second ring gear and said first sun gear, pinion means on said last named planet gear means and rotatable therewith, engaging said gear on said driven shaft, and brake means secured to said first, second and third sleeves, whereby any of said sleeves and the ring gears secured thereto, may be selectively held from rotation.

24. In a transmission, a drive shaft, a first planet gear carrier connected to said drive shaft for rotation thereby, a first pair of sun gears coaxial with said planet gear carrier, a first ring gear coaxial with said first planet gear carrier, a first planet gear means carried by said first planet gear carrier comprising a pair of gears connected for rotation in unison, one of the gears of said pair engaging said first ring gear and one of said sun gears, and the other of the gears of said pair engaging the other of said sun gears, a second ring gear connected to said first ring gear for rotation therewith, a third sun gear coaxial with said second ring gear, a second planet gear carrier coaxial with said second ring gear, a second set of planet gears carried by said second planet gear carrier, said second planet gear means comprising a pair of gears, one of which meshes with said second ring gear and said third sun gear, a driven shaft, a gear on said driven shaft, the other gear of said pair of gears of said second set of planet gears engaging said gears on said driven shaft, a pair of concentric rings rotatable with said other sun gear of said pair and said third sun gear, respectively, and means interlocking said sun gears for rotation in unison, said interlocking means comprising a means engaging said concentric rings to lock the same from relative rotation, and means engaging said engaging means for holding the same out of operation when desired.

25. In a transmission, a drive shaft, a first planet gear carrier connected to said drive shaft for rotation thereby, a first pair of sun gears coaxial with said planet gear carrier, a first ring gear coaxial with said first planet gear carrier, a first planet gear means carried by said first planet gear carrier comprising a pair of gears connected for rotation in unison; one of the gears of said pair engaging said first ring gear and one of said sun gears, and the other of the gears of said pair engaging the other of said sun gears; a second ring gear connected to said first ring gear for rotation therewith, a second pair of sun gears coaxial with said second ring gear, a second planet gear carrier coaxial with said second ring gear, a second set of planet gear means carried by said second planet gear carrier, said second planet gear means comprising a pair of gears one of which meshes with said second ring gear and one of said sun gears of said second pair and the other of which meshes with the other of said sun gears of said second pair, a driven shaft driven by one of said sun gears of said second pair, brake means for holding any of the remaining sun gears from rotation, and hydraulically operated means for operating said brake means.

26. In a transmission, a drive shaft, a first planet gear carrier connected to said drive shaft for rotation thereby, a first pair of sun gears coaxial with said planet gear carrier, a first ring gear coaxial with said first planet gear carrier, a first planet gear means carried by said first planet gear carrier comprising a pair of gears connected for rotation in unison; one of the gears of said pair engaging said first ring gear and one of said sun gears, and the other of the gears of said pair engaging the other of said sun gears; a second ring gear connected to said first ring gear for rotation therewith, a second pair of sun gears coaxial with said second ring gear, a second planet gear carrier coaxial with said second ring gear, a second set of planet gear means comprising a pair of gears one of which meshes with said second ring gear and one of said sun gears of said second pair and the other of which mehses with the other of said sun gears of said second pair, a driven shaft driven by one of said sun gears of said second pair, brake means for holding any of the remaining sun gears from rotation, hydraulically operated means for operating said brake means and control means for operating said hydraulically operated means.

27. In a transmission, a drive shaft, a first planet gear carrier connected to said drive shaft for rotation thereby, a first pair of sun gears coaxial with said planet gear carrier, a first ring gear coaxial with said first planet gear carrier, a first planet gear means carried by said first planet gear carrier comprising a pair of gears connected for rotation in unison; one of the gears of said pair engaging said first ring gear and one of said sun gears, and the other of the gears of said pair engaging the other of said sun gears; a second ring gear connected to said first ring gear for rotation therewith, a second pair of sun gears coaxial with said second ring gear, a second planet gear carrier coaxial with said second ring gear, a second set of planet gear means carried by said second planet gear carrier, said second planet gear means comprising a pair of gears one of which meshes with said second ring gear and one of said sun gears of said second pair and the other of which meshes with the other of said sun gears of said second pair, a driven shaft driven by one of said sun gears of said second pair, brake means for holding any of the remaining sun gears from rotation, hydraulically operated means for operating said brake means, a control valve for controlling hydraulic pressure to said hydraulically operated means, and means for rotating said control valve to consecutively operate said brake means to consecutively increase or decrease the speed ratio between the drive shaft and driven shaft.

28. In a transmission, a drive shaft, a first planet gear carrier connected to said drive shaft for rotation thereby, a first pair of sun gears coaxial with said planet gear carrier, a first ring gear coaxial with said first planet gear carrier, a first planet gear means carried by said first planet gear carrier comprising a pair of gears connected for rotation in unison; one of the gears of said pair engaging said first ring gear and one of said sun gears, and the other of the gears of said pair engaging the other of said sun gears; a second ring gear connected to said first ring gear for rotation therewith; a second pair of sun gears coaxial with said second ring gear, a second planet gear carrier coaxial with said second ring gear, a second set of planet gear means comprising a pair of gears one of which meshes with said second ring gear and one of said sun gears of said second pair and the other of which meshes with the other of said sun gears of said second pair, a driven shaft driven by one of said sun gears of said second pair, brake means for holding any of the remaining sun gears from rotation, a source of supply of hydraulic fluid means operated by said hydraulic fluid to operate said brake means, a control valve controlling the supply of hydraulic fluid to said hydraulically operated means, said valve means directing fluid to said hydraulically operated means in a manner to gradually increase or decrease the speed ratio between said drive shaft and said driven shaft as said control valve is actuated.

29. A transmission including a driving element and a driven element, a series of gear units interposed between said driving and driven elements, each gear unit including a pair of sun gears, a coaxial ring gear, a planet gear means, means connecting said units with said driving element and with said driven element, and means for producing an overdriving speed to the driven element by means of said series of gear units interposed between said driving and driven elements, the gears of said gear units being in constant mesh.

30. A transmission including a driving element and a driven element, a series of gear units interposed between said driving and driven elements, a gear carrier, each gear unit including a pair of sun gears co-axial with said gear carrier, a co-axial ring gear, a planet gear means, means connecting said units with said driving element and with said driven element, means for selectively arresting any of said sun gears from rotation, means for driving the driven element at the same rate of speed as the driving element through said gear unit means, and means for producing an overdriving speed to the driven element by selecting a gear ratio through some of said gear units to impart an overdriving speed to said driven element in relation to said driving element while all of the gears in said gear units remain constantly in mesh.

31. A transmission including a driving element, a driven element, a series of intermeshing gear unit means interposed between said driving and driven elements each unit including a pair of sun gears, a ring gear, a planet gear means, means connecting said units with said driving element and said driven element, means for selecting one of said gear unit means to produce a predetermined speed ratio between said driving and driven elements, means for selecting another of said gear units to produce another speed ratio between said driving and driven elements, and means for selecting still another of said units to produce a different speed ratio between said driving and driven elements.

32. A control mechanism for transmissions comprising a hydraulic pressure pump, safety valve means to control the pressure in said control mechanism, an oil pressure chamber, a rotatable control valve means having control apertures formed therein, cylinder operating brake means, said apertures in said rotatable valve adapted to coincide with apertures leading to said cylinder operating brake means, actuating means affected by the varied hydraulic pressure for rotating said rotatable pressure control valve, the apertures of said control valve being so arranged as to coincide with said apertures leading to said cylinder operating brake means at predetermined positions to permit pressure to selectively enter said cylinder operating brake means.

ALBERT L. JOHNSON.